United States Patent
Zhang et al.

(10) Patent No.: US 10,574,377 B2
(45) Date of Patent: Feb. 25, 2020

(54) INTERFERENCE SUPPRESSION METHOD, APPARATUS, AND SYSTEM

(71) Applicant: Huawei Technologies Co., Ltd., Shenzhen (CN)

(72) Inventors: Lili Zhang, Beijing (CN); Richard Stirling-Gallacher, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 86 days.

(21) Appl. No.: 15/778,991

(22) PCT Filed: Dec. 18, 2015

(86) PCT No.: PCT/CN2015/097956
§ 371 (c)(1),
(2) Date: May 24, 2018

(87) PCT Pub. No.: WO2017/101119
PCT Pub. Date: Jun. 22, 2017

(65) Prior Publication Data
US 2018/0351678 A1 Dec. 6, 2018

(51) Int. Cl.
*H04J 11/00* (2006.01)
*H04W 16/10* (2009.01)
(Continued)

(52) U.S. Cl.
CPC .......... *H04J 11/005* (2013.01); *H04W 16/10* (2013.01); *H04W 48/12* (2013.01); *H04W 48/16* (2013.01); *H04W 72/082* (2013.01)

(58) Field of Classification Search
None
See application file for complete search history.

(56) References Cited

U.S. PATENT DOCUMENTS

2010/0303013 A1    12/2010  Khandekar et al.
2013/0295949 A1*   11/2013  Seo .................. H04W 72/082
                                                        455/452.1
(Continued)

FOREIGN PATENT DOCUMENTS

CN    102449942    5/2012
CN    102469466    5/2012
(Continued)

OTHER PUBLICATIONS

Foreign Communication From a Counterpart Application, Chinese Application No. 201580072793.0, Chinese Office Action dated Apr. 28, 2019, 10 pages.
Machine Translation and Abstract of Chinese Publication No. CN104244262, Dec. 24, 2014, 30 pages.
"3rd Generation Partnership Project; Technical Specification Group Radio Access Network; Evolved Universal Terrestrial Radio Access (E-UTRA); Physical layer procedures (Release 12)," 3GPP TS 36.213, V12.7.0, Part 1, Sep. 2015, 5 pages.
(Continued)

*Primary Examiner* — Chi H Pham
*Assistant Examiner* — Vladislav Y Agureyev
(74) *Attorney, Agent, or Firm* — Conley Rose, P.C.

(57) ABSTRACT

An interference suppression method, apparatus, and system to suppress interference between an uplink signal and a downlink signal, and improve communication quality. The method includes determining, by a first base station, control channel indication information of a first cell, where the first cell is any one of cells managed by the first base station, and the control channel indication information includes at least one piece of the following information of control channel indication information of a contradirectional-transmission frequency band on which the first cell is interfered with by a neighboring cell, or control channel indication information of a contradirectional-transmission subframe in which the first cell is interfered with by a neighboring cell, and sending, by the first base station, the control channel indication information to a second base station, where the second base station is a base station of the neighboring cell.

20 Claims, 16 Drawing Sheets

(51) Int. Cl.
*H04W 48/12* (2009.01)
*H04W 48/16* (2009.01)
*H04W 72/08* (2009.01)

(56) References Cited

U.S. PATENT DOCUMENTS

| | | | |
|---|---|---|---|
| 2014/0056186 A1 | 2/2014 | Gao et al. | |
| 2014/0098720 A1* | 4/2014 | Zeng | H04W 72/0446 370/280 |
| 2014/0122957 A1 | 5/2014 | Charbit et al. | |
| 2014/0211734 A1* | 7/2014 | Seo | H04J 11/0056 370/329 |
| 2015/0016239 A1* | 1/2015 | Yi | H04J 11/003 370/201 |
| 2015/0029886 A1* | 1/2015 | Seo | H04J 11/005 370/252 |
| 2015/0117294 A1* | 4/2015 | Li | H04W 72/0446 370/312 |
| 2016/0128073 A1* | 5/2016 | Nagata | H04L 5/1469 370/280 |

FOREIGN PATENT DOCUMENTS

| | | |
|---|---|---|
| CN | 103378963 A | 10/2013 |
| CN | 103518413 A | 1/2014 |
| CN | 104244262 A | 12/2014 |
| EP | 2720401 A1 | 4/2014 |
| EP | 2784958 A1 | 10/2014 |
| EP | 2800294 A1 | 11/2014 |
| EP | 2869619 A1 | 5/2015 |
| EP | 2922358 A1 | 9/2015 |
| EP | 3007506 A1 | 4/2016 |
| WO | 2011077288 A2 | 6/2011 |
| WO | 2012155323 A1 | 11/2012 |
| WO | 2013056445 A1 | 4/2013 |
| WO | 2014196276 A1 | 12/2014 |

OTHER PUBLICATIONS

"3rd Generation Partnership Project; Technical Specification Group Radio Access Network; Evolved Universal Terrestrial Radio Access (E-UTRA); Physical layer procedures (Release 12)," 3GPP TS 36.213, V12.7.0, Part 2, Sep. 2015, 160 pages.
"3rd Generation Partnership Project; Technical Specification Group Radio Access Network; Evolved Universal Terrestrial Radio Access (E-UTRA); Physical layer procedures (Release 12)," 3GPP TS 36.213, V12.7.0, Part 3, Sep. 2015, 54 pages.
"3rd Generation Partnership Project; Technical Specification Group Radio Access Network; Evolved Universal Terrestrial Radio Access (E-UTRA); Physical layer procedures (Release 12)," 3GPP TS 36.213, V12.7.0, Part 4, Sep. 2015, 14 pages.
"3rd Generation Partnership Project; Technical Specification Group Radio Access Network; Evolved Universal Terrestrial Radio Access (E-UTRA); Physical layer procedures (Release 12)," 3GPP TS 36.213, V12.7.0, Part 5, Sep. 2015, 8 pages.
Foreign Communication From a Counterpart Application, PCT Application No. PCT/CN2015/097956, English Translation of International Search Report dated Aug. 26, 2016, 2 pages.
Foreign Communication From a Counterpart Application, PCT Application No. PCT/CN2015/097956, English Translation of Written Opinion dated Aug. 26, 2016, 7 pages.
Samsung "Inter-eNB Coordination for eIMTA," XP050716309, R133089, 3GPP TSG RAN WG1 Meeting #74, Aug. 19-23, 2013, 2 pages.
Catt, et al., "TDD eIMTA support on X2AP," XP050782217, R3-140863, 3GPP TSG-RAN3 Meeting #83bis, Mar. 31-Apr. 4, 2014, 12 pages.
Foreign Communication From a Counterpart Application, European Application No. 15910588.1, Extended European Search Report dated Oct. 16, 2018, 11 pages.

* cited by examiner

INTERFERENCE SUPPRESSION METHOD, APPARATUS, AND SYSTEM

CROSS-REFERENCE TO RELATED APPLICATION

This application is a U.S. National Stage of International Patent Application No. PCT/CN2015/097956 filed on Dec. 18, 2015, which is hereby incorporated by reference in its entirety.

TECHNICAL FIELD

The present disclosure relates to the wireless communications field, and in particular, to an interference suppression method, apparatus, and system.

BACKGROUND

In existing Long Term Evolution (LTE), a time-frequency resource is usually statically configured, and only uplink signals or downlink signals are transmitted in an entire network at a same time point. For example, for a time division duplex (TDD) system, all base stations in the entire network generally use a same uplink-downlink subframe configuration. In this way, as shown in FIG. 1, at a downlink time point, a signal received by any user equipment (UE) in a cell is interfered with by a downlink signal sent by another base station. Alternatively, as shown in FIG. 2, at an uplink time point, an uplink signal received by any base station in a network is interfered with by an uplink signal sent by UE in another cell. In FIG. 1 and FIG. 2, base stations use a same uplink-downlink subframe configuration, D means that a downlink signal is transmitted in this timeslot, and U means that an uplink signal is transmitted in this timeslot. Similarly, the same can be said for a frequency division duplex (FDD) system.

However, due to the static resource configuration manner, resource allocation cannot be flexibly adjusted according to a service volume. Therefore, for the TDD system, dynamic TDD becomes a current research focus of the 3rd Generation Partnership Project (3GPP). In the dynamic TDD, each base station in the network is allowed to flexibly adjust an uplink-downlink timeslot configuration. However, at a same time point, the following case may occur. For adjacent cells, a downlink signal is transmitted in one cell and an uplink signal is transmitted in the other cell. As shown in FIG. 3, signal transmission directions of two adjacent base stations are different in the fourth timeslot. In this case, in addition to base station-to-UE interference and UE-to-base station interference in the existing LTE system, base station-to-base station interference (interference I in FIG. 3) and UE-to-UE interference (interference II in FIG. 3) are generated in the network. For the FDD system, some uplink resources may be converted into downlink resources, that is, a downlink signal is sent on an uplink frequency band. In this way, spectrum utilization of the network is greatly improved. This may be implemented using time division, that is, as shown in FIG. 4, a base station sends a downlink signal in some timeslots on an uplink frequency band (designated as FDD UL in FIG. 4), and UE still sends an uplink signal in other timeslots on the uplink frequency band. Alternatively, this may be implemented using frequency division. As shown in FIG. 5, an uplink frequency band (designated as FDD UL in FIG. 5) resource is divided into two parts. One part is used by UE to send an uplink signal, and the other part is used by a base station to send a downlink signal. Similar to the TDD system, at a same time point, the following case may occur. For adjacent cells, a downlink signal is transmitted in one cell and an uplink signal is transmitted in the other cell. Therefore, in addition to base station-to-UE interference and UE-to-base station interference in a conventional wireless communications system, base station-to-base station interference is generated in the network.

For the two types of newly generated interference, the 3GPP sets up a related project to study how to further enhance management of interference between an uplink signal and a downlink signal. A current solution is as follows. Edge physical resource blocks (PRBs) may be reserved for transmitting a physical uplink control channel (PUCCH), and scheduling limits are used to disallow a physical downlink shared channel (PDSCH) to be transmitted on these PRBs. However, these scheduling limits can avoid PDSCH transmission only on some PRBs. To guarantee backward compatibility, downlink control information such as a physical downlink control channel (PDCCH) is still transmitted on edge PRBs. As a result, there is still interference between the downlink control information and the PUCCH.

Therefore, how to provide a new interference suppression method to suppress interference between an uplink signal and a downlink signal becomes an urgent problem to be resolved currently.

SUMMARY

Embodiments of the present disclosure provide an interference suppression method, apparatus, and system, to suppress interference between an uplink signal and a downlink signal, and improve communication quality.

To achieve the foregoing objective, the following technical solutions are used in the embodiments of the present disclosure According to a first aspect, an interference suppression method is provided, where the method includes determining, by a first base station, control channel indication information of a first cell, where the first cell is any one of cells managed by the first base station, and the control channel indication information includes at least one piece of the following information control channel indication information of a contradirectional-transmission frequency band on which the first cell is interfered with by a neighboring cell, or control channel indication information of a contradirectional-transmission subframe in which the first cell is interfered with by a neighboring cell, and sending, by the first base station, the control channel indication information to a second base station, where the second base station is a base station of the neighboring cell.

In the foregoing method, the first base station may send the control channel indication information to the second base station after determining the control channel indication information of the first cell managed by the first base station. In this way, after receiving the control channel indication information, the second base station may determine, according to the control channel indication information, information about a resource that can be occupied by an uplink channel of second UE in a cell managed by the second base station, and then, send the resource information to the second UE such that the second UE can send an uplink resource according to the resource information. The second base station learns of the control channel indication information of the first cell, and therefore can perform resource cooperation according to the control channel indication information. When determining the information about the resource that can be occupied by the uplink channel of the second UE, the second base station staggers the resource information and control information indicated by the control channel indication information of the first cell. Therefore, interference between an uplink signal and a downlink signal, that is, contradirectional-transmission interference, is suppressed, and network communication quality is improved.

According to a second aspect, an interference suppression method is provided, where the method includes determining, by a first base station, control channel indication information of a first cell, where the first cell is any one of cells managed by the first base station, and the control channel indication information includes at least one piece of the following information, control channel indication information of a contradirectional-transmission frequency band on which the first cell is interfered with by a neighboring cell, or control channel indication information of a contradirectional-transmission subframe in which the first cell is interfered with by a neighboring cell, and sending, by the first base station, the control channel indication information to first UE, where the first UE is any UE in the first cell.

In the foregoing method, the first base station may send the control channel indication information to the first UE after determining the control channel indication information of the first cell managed by the first base station. In this way, the first UE can perform resource cooperation according to the control channel indication information to receive a PDCCH sent by the first base station. Therefore, interference between an uplink signal and a downlink signal, that is, contradirectional-transmission interference, is suppressed, and network communication quality is improved. Further, a disadvantage that the first UE cannot obtain the PDCCH due to interference from the neighboring cell is also resolved.

Optionally, in the first aspect, after determining, by a first base station, control channel indication information of a first cell, the method further includes sending, by the first base station, the control channel indication information to first UE, where the first UE is any UE in the first cell.

Optionally, in an optional implementation of the first aspect or in the second aspect, sending, by the first base station, the control channel indication information to first UE includes sending, by the first base station, the control channel indication information to the first UE in a preset codirectional-transmission subframe, or sending, by the first base station, radio resource control (RRC) signaling to the first UE in a preset codirectional-transmission subframe, where the RRC signaling includes the control channel indication information, or sending, by the first base station, system information to the first UE, where the system information includes the control channel indication information, or sending, by the first base station, a timeslot configuration to the first UE, where the timeslot configuration is used to indicate the control channel indication information.

Optionally, in an optional implementation of the first aspect or in the second aspect, after determining, by a first base station, control channel indication information of a first cell, the method further includes sending, by the first base station, a downlink control channel PDCCH to the first UE according to the control channel indication information.

Further, optionally, the control channel indication information includes a physical control format indicator channel (PCFICH), and sending, by the first base station, a PDCCH to the first UE according to the control channel indication information includes sending, by the first base station, the PDCCH to the first UE in the first j orthogonal frequency division multiplexing (OFDM) symbols of each subframe on the contradirectional-transmission frequency band, where j is a value included in the PCFICH if the PCFICH includes a PCFICH of the contradirectional-transmission frequency band on which the first cell is interfered with by the neighboring cell, sending, by the first base station, the PDCCH to the first UE in the first j OFDM symbols of the contradirectional-transmission subframe if the PCFICH includes a PCFICH of the contradirectional-transmission subframe in which the first cell is interfered with by the neighboring cell, or sending, by the first base station, the PDCCH to the first UE in the first j OFDM symbols of the contradirectional-transmission subframe on the contradirectional-transmission frequency band if the PCFICH includes a PCFICH of the contradirectional-transmission frequency band on which the first cell is interfered with by the neighboring cell and a PCFICH of the contradirectional-transmission subframe in which the first cell is interfered with by the neighboring cell.

Optionally, in an optional implementation of the first aspect or in the second aspect, after determining, by a first base station, control channel indication information of a first cell, the method further includes configuring, by the first base station, the contradirectional-transmission frequency band as a multimedia broadcast multicast service single frequency network (MBSFN), and sending, to the first UE on the contradirectional-transmission frequency band, downlink data that includes a demodulation reference signal (DRS) if the control channel indication information includes the control channel indication information of the contradirectional-transmission frequency band on which the first cell is interfered with by the neighboring cell, where the first UE is any UE in the first cell, configuring, by the first base station, the contradirectional-transmission subframe as an MBSFN, and sending, to the first UE on the contradirectional-transmission frequency band, downlink data that includes a DRS if the control channel indication information includes the control channel indication information of the contradirectional-transmission subframe in which the first cell is interfered with by the neighboring cell, or configuring, by the first base station as an MBSFN, the contradirectional-transmission subframe on the contradirectional-transmission frequency band on which the first cell is interfered with by the neighboring cell, and sending, to the first UE in the contradirectional-transmission subframe on the contradirectional-transmission frequency band, downlink data that includes a DRS if the control channel indication information includes the control channel indication information of the contradirectional-transmission frequency band on which the first cell is interfered with by the neighboring cell and the control channel indication information of the contradirectional-transmission subframe in which the first cell is interfered with by the neighboring cell.

Optionally, in an optional implementation of the first aspect or in the second aspect, determining, by a first base station, control channel indication information of a first cell includes determining, by the first base station, preconfigured information as the control channel indication information of the first cell. According to a third aspect, an interference suppression method is provided, where the method includes obtaining, by a second base station, control channel indication information of a first cell, where the first cell is any one of cells managed by a first base station, and the control channel indication information includes at least one piece of the following information, control channel indication information of a contradirectional-transmission frequency band on which the first cell is interfered with by a neighboring cell, or control channel indication information of a contradirectional-transmission subframe in which the first cell is interfered with by a neighboring cell, where the neighboring cell includes a second cell, and the second cell is any one of cells managed by the second base station, determining, by the second base station according to the control channel indication information, information about a resource that can be occupied by an uplink channel of second UE, where the second UE is any UE in the second cell, and sending, by the second base station, the resource information to the second UE.

Optionally, the control channel indication information includes a PCFICH, and determining, by the second base station according to the control channel indication information, information about a resource that can be occupied by an uplink channel of second UE includes determining, by the second base station, the last (14-j) OFDM symbols of each subframe on the contradirectional-transmission frequency band as the information about the resource that can be occupied by the uplink channel of the second UE, where j is a value included in the PCFICH if the PCFICH includes a PCFICH of the contradirectional-transmission frequency band on which the first cell is interfered with by the neighboring cell, determining, by the second base station, the last (14-j) OFDM symbols of the contradirectional-transmission subframe as the information about the resource that can be occupied by the uplink channel of the second UE if the PCFICH includes a PCFICH of the contradirectional-transmission subframe in which the first cell is interfered with by the neighboring cell, or determining, by the second base station, the last (14-j) OFDM symbols of the contradirectional-transmission subframe on the contradirectional-transmission frequency band as the information about the resource that can be occupied by the uplink channel of the second UE if the PCFICH includes a PCFICH of the contradirectional-transmission frequency band on which the first cell is interfered with by the neighboring cell and a PCFICH of the contradirectional-transmission subframe in which the first cell is interfered with by the neighboring cell.

Optionally, the control channel indication information includes a PCFICH, and if the second UE is center UE in the second cell, determining, by the second base station according to the control channel indication information, information about a resource that can be occupied by an uplink channel of second UE includes, if the PCFICH includes a PCFICH of the contradirectional-transmission frequency band on which the first cell is interfered with by the neighboring cell, determining, by the second base station, all OFDM symbols of each subframe on the contradirectional-transmission frequency band as the information about the resource that can be occupied by the uplink channel of the second UE, determining, by the second base station, all OFDM symbols of the contradirectional-transmission subframe as the information about the resource that can be occupied by the uplink channel of the second UE if the PCFICH includes a PCFICH of the contradirectional-transmission subframe in which the first cell is interfered with by the neighboring cell, or determining, by the second base station, all OFDM symbols of the contradirectional-transmission subframe on the contradirectional-transmission frequency band as the information about the resource that can be occupied by the uplink channel of the second UE if the PCFICH includes a PCFICH of the contradirectional-transmission frequency band on which the first cell is interfered with by the neighboring cell and a PCFICH of the contradirectional-transmission subframe in which the first cell is interfered with by the neighboring cell.

Optionally, if the second UE is edge UE in the second cell, determining, by the second base station according to the control channel indication information, information about a resource that can be occupied by an uplink channel of second UE includes determining, by the second base station, the last (14-j) OFDM symbols of each subframe on the contradirectional-transmission frequency band as the information about the resource that can be occupied by the uplink channel of the second UE, where j is a value included in the PCFICH if the PCFICH includes a PCFICH of the contradirectional-transmission frequency band on which the first cell is interfered with by the neighboring cell, determining, by the second base station, the last (14-j) OFDM symbols of the contradirectional-transmission subframe as the information about the resource that can be occupied by the uplink channel of the second UE if the PCFICH includes a PCFICH of the contradirectional-transmission subframe in which the first cell is interfered with by the neighboring cell, or determining, by the second base station, the last (14-j) OFDM symbols of the contradirectional-transmission subframe on the contradirectional-transmission frequency band as the information about the resource that can be occupied by the uplink channel of the second UE if the PCFICH includes a PCFICH of the contradirectional-transmission frequency band on which the first cell is interfered with by the neighboring cell and a PCFICH of the contradirectional-transmission subframe in which the first cell is interfered with by the neighboring cell.

Optionally, before determining, by the second base station according to the control channel indication information, information about a resource that can be occupied by an uplink channel of second UE, the method further includes receiving, by the second base station, a reference signal parameter sent by the second UE, where the reference signal parameter includes at least one of the following parameters, a reference signal received power (RSRP) value or a reference signal received quality (RSRQ) value, and determining, by the second base station, that the second UE is center UE in the second cell if a value of at least one parameter in the reference signal parameter is not less than a preset threshold, or determining, by the second base station, that the second UE is edge UE in the second cell if values of all parameters in the reference signal parameter are less than the preset threshold.

Optionally, in a possible implementation, obtaining, by a second base station, control channel indication information of a first cell includes receiving, by the second base station, the control channel indication information of the first cell that is sent by the first base station.

In a possible implementation, the obtaining, by a second base station, control channel indication information of a first cell includes determining, by the second base station, preconfigured information as the control channel indication information of the first cell.

In the foregoing method, after obtaining the control channel indication information of the first cell managed by the first base station, the second base station may determine, according to the control channel indication information, the information about the resource that can be occupied by the uplink channel of the second UE in the cell managed by the second base station, and then, send the resource information to the second UE such that the second UE can send an uplink resource according to the resource information. The second base station learns of the control channel indication information of the first cell, and therefore can perform resource cooperation according to the control channel indication information. When determining the information about the resource that can be occupied by the uplink channel of the second UE, the second base station staggers the resource information and control information indicated by the control channel indication information of the first cell. Therefore, interference between an uplink signal and a downlink signal, that is, contradirectional-transmission interference, is suppressed, and network communication quality is improved.

According to a fourth aspect, an interference suppression method is provided, where the method includes receiving, by first UE, control channel indication information of a first cell that is sent by a first base station, where the first cell is any one of cells managed by the first base station, the first UE is any UE in the first cell, and the control channel indication information includes at least one piece of the following information, control channel indication information of a contradirectional-transmission frequency band on which the first cell is interfered with by a neighboring cell, or control channel indication information of a contradirectional-transmission subframe in which the first cell is interfered with by a neighboring cell, and receiving, by the first UE according to the control channel indication information, a PDCCH sent by the first base station.

Optionally, receiving, by first UE, control channel indication information of a first cell that is sent by a first base station includes receiving, by the first UE in a preset codirectional-transmission subframe, the control channel indication information of the first cell that is sent by the first base station, receiving, by the first UE in a preset codirectional-transmission subframe, RRC signaling sent by the first base station, where the RRC signaling includes the control channel indication information of the first cell, receiving, by the first UE, system information sent by the first base station, where the system information includes the control channel indication information of the first cell, or receiving, by the first UE, a timeslot configuration sent by the first base station, where the timeslot configuration is used to indicate the control channel indication information of the first cell.

Optionally, the control channel indication information includes a PCFICH, and receiving, by the first UE according to the control channel indication information, a PDCCH sent by the first base station includes receiving, by the first UE in the first j OFDM symbols of each subframe on the contradirectional-transmission frequency band, the PDCCH sent by the first base station if the PCFICH includes a PCFICH of the contradirectional-transmission frequency band on which the first cell is interfered with by the neighboring cell, where j is a value included in the PCFICH, receiving, by the first UE in the first j OFDM symbols of the contradirectional-transmission subframe, the PDCCH sent by the first base station if the PCFICH includes a PCFICH of the contradirectional-transmission subframe in which the first cell is interfered with by the neighboring cell, or receiving, by the first UE in the first j OFDM symbols of the contradirectional-transmission subframe on the contradirectional-transmission frequency band, the PDCCH sent by the first base station if the PCFICH includes a PCFICH of the contradirectional-transmission frequency band on which the first cell is interfered with by the neighboring cell and a PCFICH of the contradirectional-transmission subframe in which the first cell is interfered with by the neighboring cell.

In the foregoing method, the first UE may receive the control channel indication information of the first cell that is sent by the first base station. In this way, the first UE can perform resource cooperation according to the control channel indication information to receive the PDCCH sent by the first base station. Therefore, interference between an uplink signal and a downlink signal, that is, contradirectional-transmission interference, is suppressed, and network communication quality is improved. Further, a disadvantage that the first UE cannot obtain the PDCCH due to interference from the neighboring cell is also resolved.

According to a fifth aspect, a first base station is provided, where the first base station includes a processing unit and a sending unit, where the processing unit is configured to determine control channel indication information of a first cell, where the first cell is any one of cells managed by the first base station, and the control channel indication information includes at least one piece of the following information of control channel indication information of a contradirectional-transmission frequency band on which the first cell is interfered with by a neighboring cell, or control channel indication information of a contradirectional-transmission subframe in which the first cell is interfered with by a neighboring cell, and the sending unit is configured to send the control channel indication information to a second base station, where the second base station is a base station of the neighboring cell.

The first base station provided in this embodiment of the present disclosure may be configured to execute the method in the first aspect. Therefore, for technical effects that can be obtained by the first base station, refer to the technical effects of the interference suppression method executed by the first base station in the first aspect. Details are not described herein again.

According to a sixth aspect, a first base station is provided, where the first base station includes a processing unit and a sending unit, where the processing unit is configured to determine control channel indication information of a first cell, where the first cell is any one of cells managed by the first base station, and the control channel indication information includes at least one piece of the following information of control channel indication information of a contradirectional-transmission frequency band on which the first cell is interfered with by a neighboring cell, or control channel indication information of a contradirectional-transmission subframe in which the first cell is interfered with by a neighboring cell, and the sending unit is configured to send the control channel indication information to first UE, where the first UE is any UE in the first cell.

The first base station provided in this embodiment of the present disclosure may be configured to execute the method in the second aspect. Therefore, for technical effects that can be obtained by the first base station, refer to the technical effects of the interference suppression method executed by the first base station in the first aspect. Details are not described herein again.

Optionally, in the fifth aspect, the sending unit is further configured to send the control channel indication information to first UE after the processing unit determines the control channel indication information of the first cell, where the first UE is any UE in the first cell.

Optionally, in an optional implementation of the fifth aspect or in the sixth aspect, the sending unit is further configured to send the control channel indication information to the first UE in a preset codirectional-transmission subframe, send RRC signaling to the first UE in a preset codirectional-transmission subframe, where the RRC signaling includes the control channel indication information, send system information to the first UE, where the system information includes the control channel indication information, or send a timeslot configuration to the first UE, where the timeslot configuration is used to indicate the control channel indication information.

Optionally, in an optional implementation of the fifth aspect or in the sixth aspect, the sending unit is further configured to send a downlink control channel PDCCH to the first UE according to the control channel indication information after the processing unit determines the control channel indication information of the first cell.

Further, optionally, the control channel indication information includes a PCFICH, and the sending unit is further configured to send the PDCCH to the first UE in the first j OFDM symbols of each subframe on the contradirectional-transmission frequency band, where j is a value included in the PCFICH if the PCFICH includes a PCFICH of the contradirectional-transmission frequency band on which the first cell is interfered with by the neighboring cell, send the PDCCH to the first UE in the first j OFDM symbols of the contradirectional-transmission subframe if the PCFICH includes a PCFICH of the contradirectional-transmission subframe in which the first cell is interfered with by the neighboring cell, or send the PDCCH to the first UE in the first j OFDM symbols of the contradirectional-transmission subframe on the contradirectional-transmission frequency band if the PCFICH includes a PCFICH of the contradirectional-transmission frequency band on which the first cell is interfered with by the neighboring cell and a PCFICH of the contradirectional-transmission subframe in which the first cell is interfered with by the neighboring cell.

Optionally, in an optional implementation of the fifth aspect or in the sixth aspect, the processing unit is further configured to, after determining the control channel indication information of the first cell, if the control channel indication information includes the control channel indication information of the contradirectional-transmission frequency band on which the first cell is interfered with by the neighboring cell, configure the contradirectional-transmission frequency band as an MBSFN, and the sending unit is further configured to send, to the first UE on the contradirectional-transmission frequency band, downlink data that includes a DRS, where the first UE is any UE in the first cell, the processing unit is further configured to, if the control channel indication information includes the control channel indication information of the contradirectional-transmission subframe in which the first cell is interfered with by the neighboring cell, configure the contradirectional-transmission subframe as an MBSFN, and the sending unit is further configured to send, to the first UE on the contradirectional-transmission frequency band, downlink data that includes a DRS, or the processing unit is further configured to, if the control channel indication information includes the control channel indication information of the contradirectional-transmission frequency band on which the first cell is interfered with by the neighboring cell and the control channel indication information of the contradirectional-transmission subframe in which the first cell is interfered with by the neighboring cell, configure, as an MBSFN, the contradirectional-transmission subframe on the contradirectional-transmission frequency band on which the first cell is interfered with by the neighboring cell, and the sending unit is further configured to send, to the first UE in the contradirectional-transmission subframe on the contradirectional-transmission frequency band, downlink data that includes a DRS.

Optionally, in an optional implementation of the fifth aspect or in the sixth aspect, the processing unit is further configured to determine preconfigured information as the control channel indication information of the first cell.

According to a seventh aspect, a second base station is provided, where the second base station includes a processing unit and a sending unit, where the processing unit is configured to obtain control channel indication information of a first cell, where the first cell is any one of cells managed by a first base station, and the control channel indication information includes at least one piece of the following information of control channel indication information of a contradirectional-transmission frequency band on which the first cell is interfered with by a neighboring cell, or control channel indication information of a contradirectional-transmission subframe in which the first cell is interfered with by a neighboring cell, where the neighboring cell includes a second cell, and the second cell is any one of cells managed by the second base station, the processing unit is further configured to determine, according to the control channel indication information, information about a resource that can be occupied by an uplink channel of second UE, where the second UE is any UE in the second cell, and the sending unit is configured to send the resource information to the second UE.

Optionally, the control channel indication information includes a PCFICH, and the processing unit is further configured to determine the last (14-j) OFDM symbols of each subframe on the contradirectional-transmission frequency band as the information about the resource that can be occupied by the uplink channel of the second UE if the PCFICH includes a PCFICH of the contradirectional-transmission frequency band on which the first cell is interfered with by the neighboring cell, where j is a value included in the PCFICH, determine the last (14-j) OFDM symbols of the contradirectional-transmission subframe as the information about the resource that can be occupied by the uplink channel of the second UE if the PCFICH includes a PCFICH of the contradirectional-transmission subframe in which the first cell is interfered with by the neighboring cell, or determine the last (14-j) OFDM symbols of the contradirectional-transmission subframe on the contradirectional-transmission frequency band as the information about the resource that can be occupied by the uplink channel of the second UE if the PCFICH includes a PCFICH of the contradirectional-transmission frequency band on which the first cell is interfered with by the neighboring cell and a PCFICH of the contradirectional-transmission subframe in which the first cell is interfered with by the neighboring cell.

Optionally, the control channel indication information includes a PCFICH, and if the second UE is center UE in the second cell, the processing unit is further configured to determine all OFDM symbols of each subframe on the contradirectional-transmission frequency band as the information about the resource that can be occupied by the uplink channel of the second UE if the PCFICH includes a PCFICH of the contradirectional-transmission frequency band on which the first cell is interfered with by the neighboring cell, determine all OFDM symbols of the contradirectional-transmission subframe as the information about the resource that can be occupied by the uplink channel of the second UE if the PCFICH includes a PCFICH of the contradirectional-transmission subframe in which the first cell is interfered with by the neighboring cell, or determine all OFDM symbols of the contradirectional-transmission subframe on the contradirectional-transmission frequency band as the information about the resource that can be occupied by the uplink channel of the second UE if the PCFICH includes a PCFICH of the contradirectional-transmission frequency band on which the first cell is interfered with by the neighboring cell and a PCFICH of the contradirectional-transmission subframe in which the first cell is interfered with by the neighboring cell.

Optionally, if the second UE is edge UE in the second cell, the processing unit is further configured to determine the last (14-j) OFDM symbols of each subframe on the contradirectional-transmission frequency band as the information about the resource that can be occupied by the uplink channel of the second UE if the PCFICH includes a PCFICH of the contradirectional-transmission frequency band on which the first cell is interfered with by the neighboring cell, where j is a value included in the PCFICH, determine the last (14-j) OFDM symbols of the contradirectional-transmission subframe as the information about the resource that can be occupied by the uplink channel of the second UE if the PCFICH includes a PCFICH of the contradirectional-transmission subframe in which the first cell is interfered with by the neighboring cell, or determine the last (14-j) OFDM symbols of the contradirectional-transmission subframe on the contradirectional-transmission frequency band as the information about the resource that can be occupied by the uplink channel of the second UE if the PCFICH includes a PCFICH of the contradirectional-transmission frequency band on which the first cell is interfered with by the neighboring cell and a PCFICH of the contradirectional-transmission subframe in which the first cell is interfered with by the neighboring cell.

Optionally, the second base station further includes a receiving unit, where the receiving unit is configured to receive a reference signal parameter sent by the second UE before the processing unit determines, according to the control channel indication information, the information about the resource that can be occupied by the uplink channel of the second UE, where the reference signal parameter includes at least one of the following parameters, an RSRP value or an RSRQ value, and the processing unit is further configured to determine that the second UE is center UE in the second cell if a value of at least one parameter in the reference signal parameter is not less than a preset threshold, or determine that the second UE is edge UE in the second cell if values of all parameters in the reference signal parameter are less than the preset threshold.

Optionally, in a possible implementation, the second base station further includes the receiving unit, and the processing unit is further configured to receive, using the receiving unit, the control channel indication information of the first cell that is sent by the first base station.

In another possible implementation, the processing unit is further configured to determine preconfigured information as the control channel indication information of the first cell.

The second base station provided in this embodiment of the present disclosure may be configured to execute the method in the third aspect. Therefore, for technical effects that can be obtained by the second base station, refer to the technical effects of the interference suppression method executed by the second base station in the third aspect. Details are not described herein again.

According to an eighth aspect, first UE is provided, where the first UE includes a receiving unit, where the receiving unit is configured to receive control channel indication information of a first cell that is sent by a first base station, where the first cell is any one of cells managed by the first base station, the first UE is any UE in the first cell, and the control channel indication information includes at least one piece of the following information of control channel indication information of a contradirectional-transmission frequency band on which the first cell is interfered with by a neighboring cell, or control channel indication information of a contradirectional-transmission subframe in which the first cell is interfered with by a neighboring cell, and the receiving unit is further configured to receive, according to the control channel indication information, a PDCCH sent by the first base station.

Optionally, the receiving unit is further configured to receive, in a preset codirectional-transmission subframe, the control channel indication information of the first cell that is sent by the first base station, receive, in a preset codirectional-transmission subframe, RRC signaling sent by the first base station, where the RRC signaling includes the control channel indication information of the first cell, receive system information sent by the first base station, where the system information includes the control channel indication information of the first cell, or receive a timeslot configuration sent by the first base station, where the timeslot configuration is used to indicate the control channel indication information of the first cell.

Optionally, the control channel indication information includes a PCFICH, and the receiving unit is further configured to, if the PCFICH includes a PCFICH of the contradirectional-transmission frequency band on which the first cell is interfered with by the neighboring cell, receive, in the first j OFDM symbols of each subframe on the contradirectional-transmission frequency band, the PDCCH sent by the first base station, where j is a value included in the PCFICH, if the PCFICH includes a PCFICH of the contradirectional-transmission subframe in which the first cell is interfered with by the neighboring cell, receive, in the first j OFDM symbols of the contradirectional-transmission subframe, the PDCCH sent by the first base station, or if the PCFICH includes a PCFICH of the contradirectional-transmission frequency band on which the first cell is interfered with by the neighboring cell and a PCFICH of the contradirectional-transmission subframe in which the first cell is interfered with by the neighboring cell, receive, in the first j OFDM symbols of the contradirectional-transmission subframe on the contradirectional-transmission frequency band, the PDCCH sent by the first base station.

The first UE provided in this embodiment of the present disclosure may be configured to execute the method in the fourth aspect. Therefore, for technical effects that can be obtained by the first UE, refer to the technical effects of the interference suppression method executed by the first UE in the fourth aspect. Details are not described herein again.

Optionally, in any one of the first aspect to the eighth aspect, or the optional implementations of any one of the first aspect to the eighth aspect, the contradirectional-transmission frequency band is a flexible half-duplex frequency band configured for contradirectional transmission, and the contradirectional-transmission subframe is a subframe configured for contradirectional transmission on the contradirectional-transmission frequency band.

According to a ninth aspect, an interference suppression method is provided, where the method includes obtaining, by a first base station, control channel indication information of a first cell, where the first cell is any one of cells managed by the first base station, and the control channel indication information includes at least one piece of the following information of control channel indication information of a contradirectional-transmission frequency band on which the first cell is interfered with by a neighboring cell, or control channel indication information of a contradirectional-transmission subframe in which the first cell is interfered with by a neighboring cell, where the neighboring cell includes a second cell, and the second cell is any one of cells managed by the second base station, and if the control channel indication information includes the control channel indication information of the contradirectional-transmission frequency band on which the first cell is interfered with by the neighboring cell, configuring, by the first base station, the contradirectional-transmission frequency band as an MBSFN, and sending, to first UE on the contradirectional-transmission frequency band, downlink data that includes a DRS, where the first UE is any UE in the first cell, if the control channel indication information includes the control channel indication information of the contradirectional-transmission subframe in which the first cell is interfered with by the neighboring cell, configuring, by the first base station, the contradirectional-transmission subframe as an MBSFN, and sending, to the first UE on the contradirectional-transmission frequency band, downlink data that includes a DRS, or if the control channel indication information includes the control channel indication information of the contradirectional-transmission frequency band on which the first cell is interfered with by the neighboring cell and the control channel indication information of the contradirectional-transmission subframe in which the first cell is interfered with by the neighboring cell, configuring, by the first base station as an MBSFN, the contradirectional-transmission subframe on the contradirectional-transmission frequency band on which the first cell is interfered with by the neighboring cell, and sending, to the first UE in the contradirectional-transmission subframe on the contradirectional-transmission frequency band, downlink data that includes a DRS.

In the foregoing method, when the contradirectional-transmission frequency band and/or the contradirectional-transmission subframe are/is configured as an MBSFN, UE that performs communication on the contradirectional-transmission frequency band and/or in the contradirectional-transmission subframe can perform demodulation based on the DRS, without performing demodulation based on a cell-specific pilot or cell-specific reference signal (CRS) any more. Because power of the DRS is far lower than that of the CRS, the DRS causes less interference than the CRS, that is, both interference from the CRS and interference to the CRS are minimized. Therefore, contradirectional interference between the CRS and uplink transmission is reduced.

According to a tenth aspect, an interference suppression method is provided, where the method includes receiving, by first UE on a contradirectional-transmission frequency band, downlink data that is sent by a first base station and that includes a DRS, where the contradirectional-transmission frequency band is configured as an MBSFN, and the first UE is any UE in a cell managed by the first base station, and demodulating, by the first UE, the downlink data based on the DRS, the method includes receiving, by first UE in a contradirectional-transmission subframe, downlink data that is sent by a first base station and that includes a DRS, where the contradirectional subframe frequency band is configured as an MBSFN, and demodulating, by the first UE, the downlink data based on the DRS, or the method includes receiving, by first UE in a contradirectional-transmission subframe on a contradirectional-transmission frequency band, downlink data that is sent by a first base station and that includes a DRS, where the contradirectional subframe frequency band on the contradirectional-transmission frequency band is configured as an MBSFN, and demodulating, by the first UE, the downlink data based on the DRS.

In the foregoing method, when the contradirectional-transmission frequency band and/or the contradirectional-transmission subframe are/is configured as an MBSFN, UE that performs communication on the contradirectional-transmission frequency band and/or in the contradirectional-transmission subframe can perform demodulation based on the DRS, without performing demodulation based on a cell-specific pilot CRS any more. Because power of the DRS is far lower than that of the CRS, the DRS causes less interference than the CRS, that is, both interference from the CRS and interference to the CRS are minimized. Therefore, contradirectional interference between the CRS and uplink transmission is reduced.

According to an eleventh aspect, a first base station is provided, where the first base station includes a processing unit and a sending unit, where the processing unit is configured to obtain control channel indication information of a first cell, where the first cell is any one of cells managed by the first base station, and the control channel indication information includes at least one piece of the following information of control channel indication information of a contradirectional-transmission frequency band on which the first cell is interfered with by a neighboring cell, or control channel indication information of a contradirectional-transmission subframe in which the first cell is interfered with by a neighboring cell, where the neighboring cell includes a second cell, and the second cell is any one of cells managed by the second base station, where the processing unit is further configured to, if the control channel indication information includes the control channel indication information of the contradirectional-transmission frequency band on which the first cell is interfered with by the neighboring cell, configure the contradirectional-transmission frequency band as an MBSFN, and the sending unit is configured to send, to first UE on the contradirectional-transmission frequency band, downlink data that includes a DRS, where the first UE is any UE in the first cell, the processing unit is further configured to, if the control channel indication information includes the control channel indication information of the contradirectional-transmission subframe in which the first cell is interfered with by the neighboring cell, configure, by the first base station, the contradirectional-transmission subframe as an MBSFN, and the sending unit is configured to send, to the first UE on the contradirectional-transmission frequency band, downlink data that includes a DRS, or the processing unit is further configured to, if the control channel indication information includes the control channel indication information of the contradirectional-transmission frequency band on which the first cell is interfered with by the neighboring cell and the control channel indication information of the contradirectional-transmission subframe in which the first cell is interfered with by the neighboring cell, configure, by the first base station as an MBSFN, the contradirectional-transmission subframe on the contradirectional-transmission frequency band on which the first cell is interfered with by the neighboring cell, and the sending unit is configured to send, to the first UE in the contradirectional-transmission subframe on the contradirectional-transmission frequency band, downlink data that includes a DRS.

The first base station provided in this embodiment of the present disclosure may be configured to execute the method in the ninth aspect. Therefore, for technical effects that can be obtained by the first base station, refer to the technical effects of the interference suppression method executed by the first base station in the ninth aspect. Details are not described herein again.

According to a twelfth aspect, first UE is provided, where the first UE includes a receiving unit and a processing unit, where the receiving unit is configured to receive, on a contradirectional-transmission frequency band, downlink data that is sent by a first base station and that includes a DRS, where the contradirectional-transmission frequency band is configured as an MBSFN, and the first UE is any UE in a cell managed by the first base station, and the processing unit is configured to demodulate the downlink data based on the DRS, the receiving unit is configured to receive, in a contradirectional-transmission subframe, downlink data that is sent by a first base station and that includes a DRS, where the contradirectional subframe frequency band is configured as an MBSFN, and the processing unit is configured to demodulate the downlink data based on the DRS, or the receiving unit is configured to receive, in a contradirectional-transmission subframe on a contradirectional-transmission frequency band, downlink data that is sent by a first base station and that includes a DRS, where the contradirectional subframe frequency band on the contradirectional-transmission frequency band is configured as an MBSFN, and the processing unit is configured to demodulate the downlink data based on the DRS.

The first UE provided in this embodiment of the present disclosure may be configured to execute the method in the tenth aspect. Therefore, for technical effects that can be obtained by the first UE, refer to the technical effects of the interference suppression method executed by the first UE in the tenth aspect. Details are not described herein again.

According to a thirteenth aspect, a first base station is provided, where the first base station includes a processor, a memory, a bus, and a communications interface, where the memory is configured to store a computer-executable instruction, the processor and the memory are connected using the bus, and when the first base station runs, the processor executes the computer-executable instruction stored in the memory such that the first base station executes the interference suppression method according to any one of the first aspect, or executes the interference suppression method according to any one of the second aspect, or executes the interference suppression method according to any one of the ninth aspect.

The first base station provided in this embodiment of the present disclosure may execute the interference suppression method according to any one of the first aspect, or execute the interference suppression method according to any one of the second aspect, or execute the interference suppression method according to any one of the ninth aspect. Therefore, for technical effects that can be obtained by the first base station, refer to the technical effects of the interference suppression method in the first aspect, the second aspect, or the ninth aspect. Details are not described herein again.

According to a fourteenth aspect, a second base station is provided, where the second base station includes a processor, a memory, a bus, and a communications interface, where the memory is configured to store a computer-executable instruction, the processor and the memory are connected using the bus, and when the second base station runs, the processor executes the computer-executable instruction stored in the memory such that the second base station executes the interference suppression method according to any one of the third aspect.

The second base station in this embodiment of the present disclosure may execute the interference suppression method according to any one of the third aspect. Therefore, for technical effects that can be obtained by the second base station, refer to the technical effects of the interference suppression method in the third aspect. Details are not described herein again.

According to a fifteenth aspect, first UE is provided, where the first UE includes a processor, a memory, a bus, and a communications interface, where the memory is configured to store a computer-executable instruction, the processor and the memory are connected using the bus, and when the first UE runs, the processor executes the computer-executable instruction stored in the memory such that the first UE executes the interference suppression method according to any one of the fourth aspect, or executes the interference suppression method according to any one of the tenth aspect.

The first UE provided in this embodiment of the present disclosure may execute the interference suppression method according to any one of the third aspect, or execute the interference suppression method according to any one of the tenth aspect. Therefore, for technical effects that can be obtained by the first UE, refer to the technical effects of the interference suppression method in the fourth aspect or the tenth aspect. Details are not described herein again.

These aspects or other aspects of the present disclosure are clearer and more comprehensible in descriptions of the following embodiments.

DESCRIPTION OF EMBODIMENTS

Figure 1:
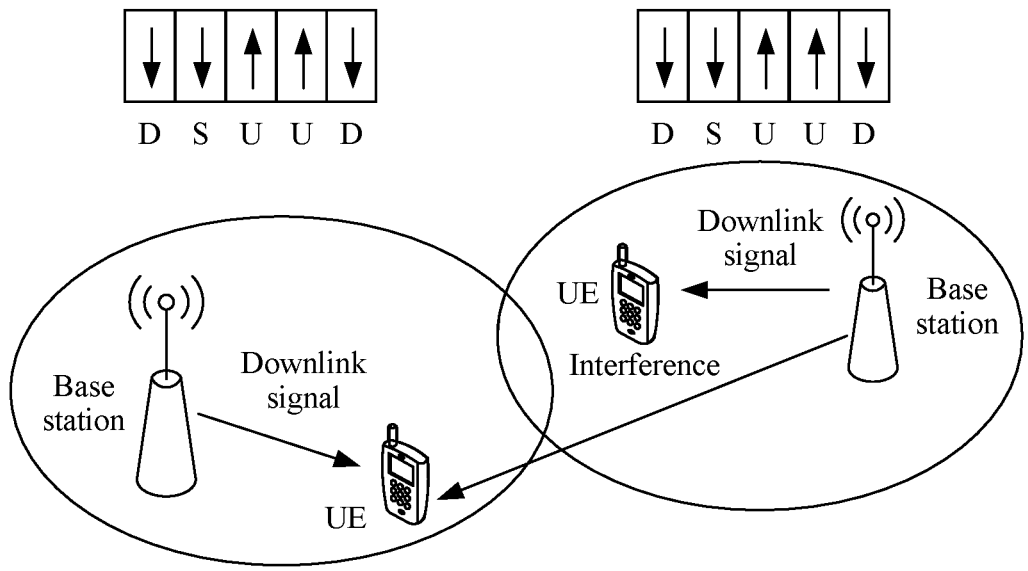
FIG. 1 is a first schematic diagram of an interference scenario.

First, to make descriptions of the following embodiments clear and concise, related technologies are briefly described below.

In an LTE system or an LTE Advanced (LTE-A) system, an orthogonal frequency division multiple access (OFDMA) manner is usually used as a downlink multiple access manner. A downlink resource in the system is divided into OFDM symbols in terms of time, and is divided into subcarriers in terms of frequency. According to an LTE standard, one radio frame includes 10 subframes, one subframe is 1 millisecond (ms), and subframes of each radio frame are numbered from 0 to 9. One subframe includes two timeslots. For a normal cyclic prefix (CP), each timeslot includes seven OFDM symbols numbered from 0 to 6. For an extended CP, each timeslot includes six OFDM symbols numbered from 0 to 5. A time-frequency resource that includes one OFDM symbol and one subcarrier is referred to as a resource element (RE). A size of one PRB is defined as one timeslot in terms of time and 180 kilohertz (kHz) in frequency domain. When a subcarrier spacing is 15 kHz, one PRB includes 12 subcarriers in terms of frequency. In this case, one PRB includes 84 or 72 REs in total. PRBs are numbered in frequency domain to obtain PRB indexes. One PRB pair is defined as a pair of PRBs whose PRB indexes are the same in two timeslots in one subframe.

The LTE system supports two frame structure types, a type 1 and a type 2. The type 1 is used for FDD, and the type 2 is used for TDD. For the frame structure type 1 in FDD, each subframe included in a 10 ms radio frame may be used for both downlink transmission and uplink transmission. For the frame structure type 2 in TDD, a subframe included in a 10 ms radio frame is a downlink subframe, an uplink subframe, or a special subframe. A specific downlink subframe, a specific uplink subframe, or a specific special subframe is determined according to a TDD uplink-downlink configuration. LTE currently supports seven different TDD uplink-downlink configurations. As shown in Table 1, D represents the downlink subframe for downlink transmission, S represents the special subframe, and U represents the uplink subframe.

TABLE 1

| TDD uplink-downlink configuration | Downlink-to-uplink switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

As described in the background, in a current LTE system, due to contradirectional transmission, two types of interference are newly generated, base station-to-base station interference and UE-to-UE interference. To further enhance management of interference between an uplink signal and a downlink signal, the 3GPP project proposes a related solution. However, in the newly-proposed solution, PDSCH transmission can be avoided only on some PRBs, and downlink control information such as a PDCCH is still transmitted on edge PRBs. Therefore, there is still interference between the downlink control information and a PUCCH.

To resolve the problem, the embodiments of the present disclosure provide an interference suppression method, apparatus, and system. The following describes the technical solutions in the embodiments of the present disclosure with reference to the accompanying drawings in the embodiments of the present disclosure.

It should be noted that, to facilitate clear description of the technical solutions in the embodiments of the present disclosure, words such as "first" and "second" are used in the embodiments of the present disclosure to distinguish between same items or similar items that provide basically same functions or purposes. A person skilled in the art can understand that the words such as "first" and "second" do not limit a quantity and an execution sequence.

It should be noted that, in the embodiments of the present disclosure, "l" means "or". For example, A/B may represent A or B. In this specification, "and/or" describes only an association relationship for describing associated objects and represents that three relationships may exist. For example, A and/or B may represent the following three cases, only A exists, both A and B exist, and only B exists. "A plurality of" means two or more.

Terms such as "component," "module," and "system" used in this application are used to represent computer-related entities. The computer-related entities may be hardware, firmware, combinations of hardware and software, software, or software in running. For example, a component may be but is not limited to a process that runs on a processor, a processor, an object, an executable file, a thread of execution, a program, and/or a computer. For example, both a computing device and an application that runs on the computing device may be components. One or more components may reside within a process and/or a thread of execution, and a component may be located on one computer and/or distributed between two or more computers. In addition, these components may be executed from various computer-readable media that have various data structures. These components may perform communication using a local and/or remote process and according to, for example, a signal having one or more data packets (for example, data from one component, where the component interacts with another component in a local system or a distributed system, and/or interacts with another system via a network such as the Internet using a signal).

A wireless communications network is a network that provides a wireless communication function. The wireless communications network may use different communications technologies, such as Code Division Multiple Access (CDMA), Wideband CDMA (WCDMA), Time Division Multiple Access (TDMA), Frequency Division Multiple Access (FDMA), OFDMA, single carrier FDMA (SC-FDMA), and carrier sense multiple access with collision avoidance. According to factors such as capacities, rates, and delays of different networks, networks may be classified into a second generation (2G) network, a third generation (3G)

network, and a fourth generation (4G) network. A typical 2G network includes a Global System for Mobile Communications (GSM) network or a general packet radio service (GPRS) network. A typical 3G network includes a Universal Mobile Telecommunications System (UMTS) network. A typical 4G network includes an LTE network. The UMTS network sometimes may also be referred to as a universal terrestrial radio access network (UTRAN). The LTE network sometimes may also be referred to as an evolved UTRAN (E-UTRAN). According to different resource allocation manners, networks may be classified into a cellular communications network and a wireless local area network (WLAN). The cellular communications network is based on scheduling, and the WLAN is based on contention. All the foregoing 2G, 3G, and 4G networks are cellular communications networks. A person skilled in the art should know that, with development of technologies, the technical solutions provided in the embodiments of the present disclosure may also be applied to another wireless communications network such as a four point five generation (4.5G) or fifth generation (5G) network, or another non-cellular communications network. For brevity, in the embodiments of the present disclosure, the wireless communications network sometimes is briefly referred to as a network.

UE is a terminal device, and may be a movable terminal device or an unmovable terminal device. The device is mainly configured to receive or send service data. The UE may be distributed in a network. In different networks, the UE has different names, such as a terminal, a mobile station, a subscriber unit, a station, a cellular phone, a personal digital assistant, a wireless modem, a wireless communications device, a handheld device, a laptop computer, a cordless telephone set, and a wireless local loop station. The UE may communicate with one or more core networks using a radio access network (RAN) (an access part of the wireless communications network), for example, exchange voice and/or data with the radio access network.

A base station device may also be referred to as a base station, and is an apparatus that is deployed in a radio access network and that is configured to provide a wireless communications function. For example, in a 2G network, a device that provides a base station function includes a base transceiver station (BTS) and a base station controller (BSC). In a 3G network, a device that provides a base station function includes a NodeB and a radio network controller RNC). In a 4G network, a device that provides a base station function includes an evolved NodeB (eNB). In a WLAN, a device that provides a base station function is an access point (AP).

In addition, this application describes each aspect with reference to a wireless network device. The wireless network device may be a base station. The base station may be configured to communicate with one or more UEs, or may be configured to communicate with one or more base stations having some functions of UE (for example, communication between a macro base station and a micro base station such as an access point). Alternatively, the wireless network device may be UE. The UE may be configured to communicate with one or more UEs (for example, device-to-device (D2D) communication), or may be configured to communicate with one or more base stations. The UE may be further referred to as a user terminal, and may include some or all functions of a system, a subscriber unit, a subscriber station, a mobile station, a mobile wireless terminal, a mobile device, a node, a device, a remote station, a remote terminal, a terminal, a wireless communications device, a wireless communications apparatus, or a user agent. The UE may be a cellular phone, a cordless telephone set, a Session Initiation Protocol (SIP) phone, a smartphone, a wireless local loop (WLL) station, a personal digital assistant (PDA), a laptop computer, a handheld communications device, a handheld computing device, a satellite wireless device, a wireless modem card, and/or another processing device configured to perform communication in a wireless system. The base station may be further referred to as an access point, a node, a NodeB, an eNB, or another network entity, and may include some or all functions of the foregoing network entities. The base station may communicate with a wireless terminal using an air interface. The communication may be performed using one or more sectors. The base station may convert a received over-the-air frame into an Internet Protocol (IP) packet, and serve as a router between the wireless terminal and a remaining part of an access network. The access network includes an IP network. The base station may further coordinate attribute management of the air interface, and may be further used as a gateway between a wired network and a wireless network.

Each aspect, embodiment, or feature is presented in this application by describing a system that may include a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may be used.

In addition, in the embodiments of the present disclosure, the word such as "example" or "for example" is used to represent "giving an example, an illustration, or a description". Any embodiment or design scheme described as an "example" in this application should not be explained as being more preferred or having more advantages than another embodiment or design scheme. Exactly, the word such as "example" or "for example" is intended to present a concept in a specific manner.

In the embodiments of the present disclosure, "information", "signal", "message", and "channel" may be interchangeably used sometimes. It should be noted that, expressed meanings are consistent when differences are not emphasized. "Of" and "corresponding" may be interchangeably used sometimes. It should be noted that, expressed meanings are consistent when differences are not emphasized.

Network architectures and service scenarios that are described in the embodiments of the present disclosure are used to describe the technical solutions in the embodiments of the present disclosure more clearly, but are not intended to limit the technical solutions provided in the embodiments of the present disclosure. A person of ordinary skill in the art may learn that, with evolution of the network architectures and emergence of a new service scenario, the technical solutions provided in the embodiments of the present disclosure are also applicable to a similar technical problem.

In the embodiments of the present disclosure, a 4G network scenario in a wireless communications network is used for description. It should be noted that, the solutions in the embodiments of the present disclosure may be further applied to another wireless communications network, and a corresponding name may also be replaced with a name of a corresponding function in the other wireless communications network.

Figure 6:
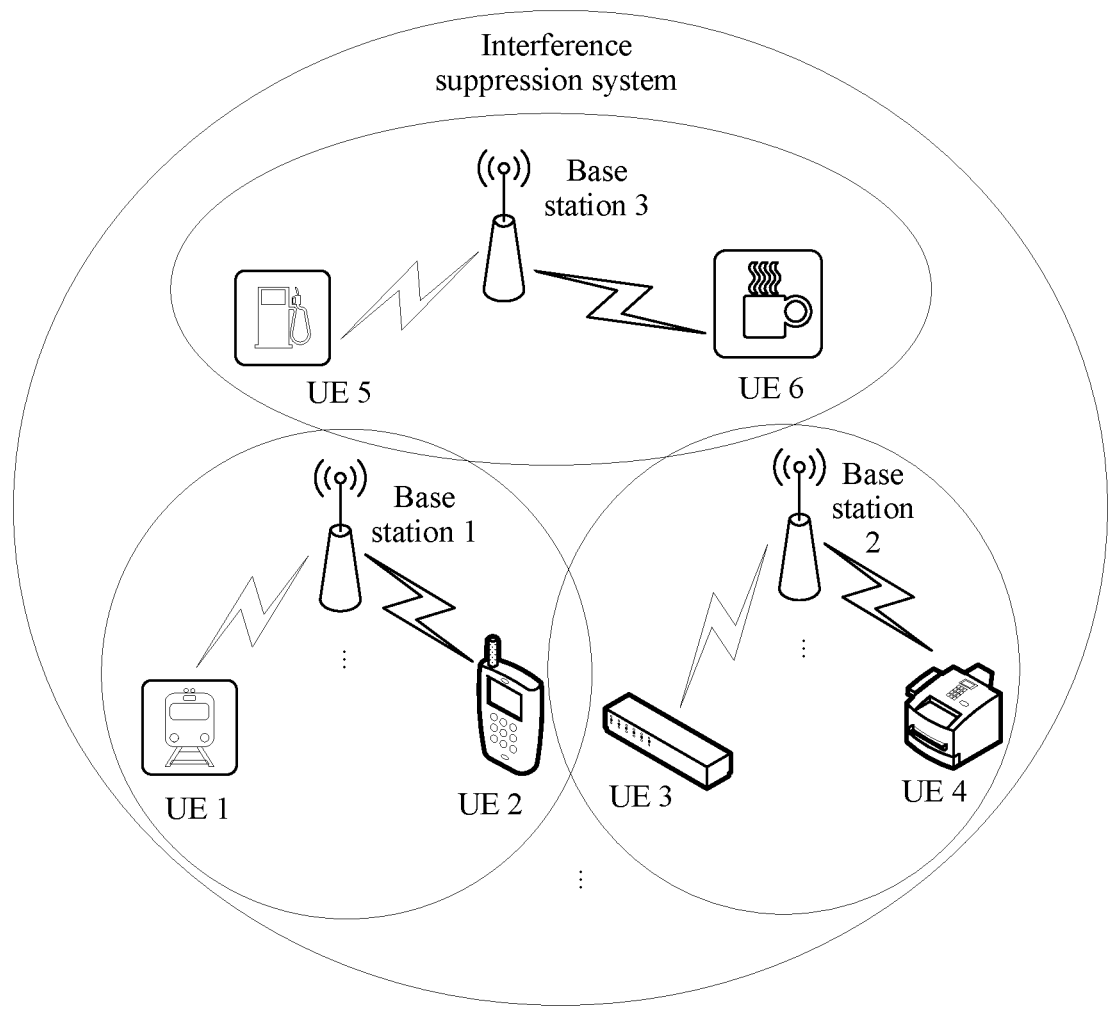
FIG. 6 is a schematic structural diagram of an interference suppression system according to an embodiment of the present disclosure.

As shown in FIG. 6, FIG. 6 is a schematic architectural diagram of an interference suppression system applicable to the embodiments of the present disclosure. The interference suppression system includes a plurality of base stations and a plurality of UEs in a cell managed by each base station. The plurality of base stations may communicate with each other, and each of the plurality of base stations may also communicate with each of the plurality of UEs in the cell managed by the base station.

It should be noted that, in FIG. 6, the following example is used for description. The interference suppression system includes three base stations (denoted as a base station 1, a base station 2, and a base station 3), and a cell managed by each base station includes two UEs (UEs in a cell managed by the base station 1 are denoted as UE 1 and UE 2, UEs in a cell managed by the base station 2 are denoted as UE 3 and UE 4, and UEs in a cell managed by the base station 3 are denoted as UE 5 and UE 6). Certainly, the interference suppression system is not limited to including only three base stations, but may include two base stations, four base stations, or another quantity of base stations. Each base station is not limited to including only two UEs, either, but may include three UEs, four UEs, or another quantity of UEs. FIG. 6 is only an example for description. A quantity of base stations in the interference suppression system and a quantity of UEs in the cell managed by each base station are not limited in the embodiments of the present disclosure.

Figure 7:
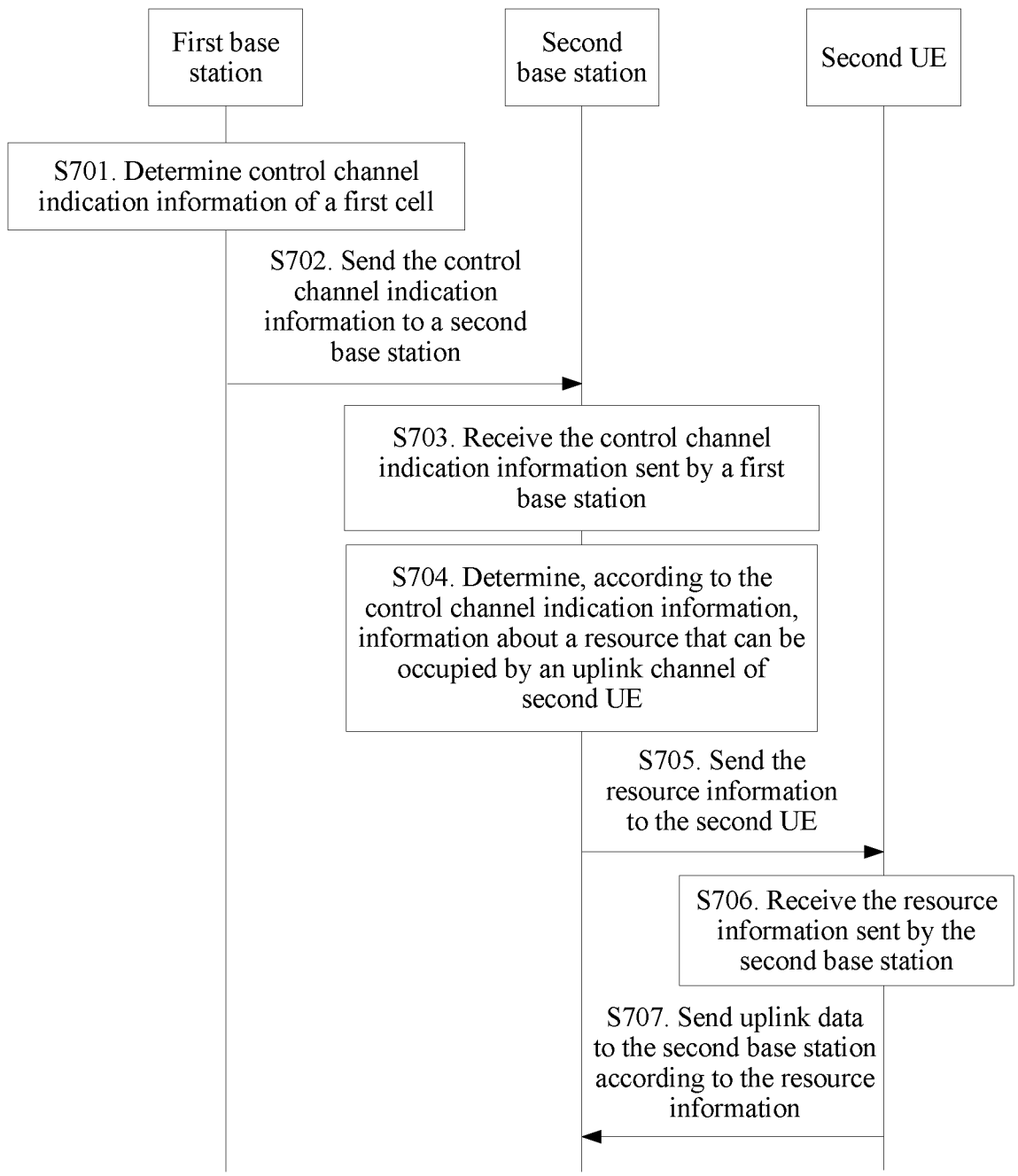
FIG. 7 is a first schematic flowchart of an interference suppression method according to an embodiment of the present disclosure.

Based on the interference suppression system shown in FIG. 6, an embodiment of the present disclosure provides an interference suppression method. The following example is used for description. A first base station (assuming that the first base station is the base station 1 in FIG. 6) interacts with a second base station (assuming that the second base station is the base station 2 or the base station 3 in FIG. 6), and the second base station interacts with second UE (which may be any UE in a cell managed by the second base station, for example, the second UE may be the UE 3 when the second base station is the base station 2) in the cell managed by the second base station. As shown in FIG. 7, the method includes steps S701 to S707.

Step S701. A first base station determines control channel indication information of a first cell.

The first cell is any one of cells managed by the first base station, and the control channel indication information may include at least one piece of the following information of control channel indication information of a contradirectional-transmission frequency band on which the first cell is interfered with by a neighboring cell, or control channel indication information of a contradirectional-transmission subframe in which the first cell is interfered with by a neighboring cell.

Step S702. The first base station sends the control channel indication information to a second base station.

Step S703. The second base station receives the control channel indication information sent by the first base station.

Step S704. The second base station determines, according to the control channel indication information, information about a resource that can be occupied by an uplink channel of second UE.

Step S705. The second base station sends the resource information to the second UE.

Step S706. The second UE receives the resource information sent by the second base station.

Step S707. The second UE sends uplink data to the second base station according to the resource information.

Further, in step S701 in this embodiment of the present disclosure, the first cell may be interfered with by one neighboring cell, or may be interfered with by a plurality of neighboring cells. Therefore, a quantity of neighboring cells is not further limited in this embodiment of the present disclosure.

For example, in FIG. 6, a cell 1 managed by the base station 1 may be interfered with only by a cell 2 managed by the base station 2, or may be interfered with by both a cell 2 managed by the base station 2 and a cell 3 managed by the base station 3, or may be interfered with by a cell managed by another base station. This is not further limited in this embodiment of the present disclosure.

Figure 2:
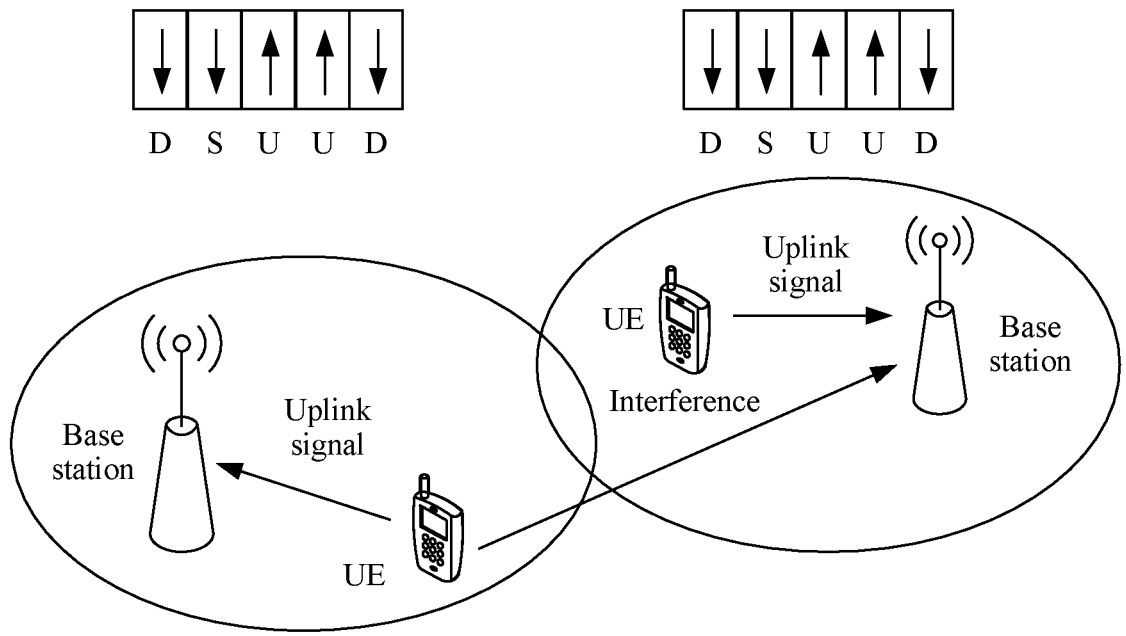
FIG. 2 is a second schematic diagram of an interference scenario.
Figure 3:
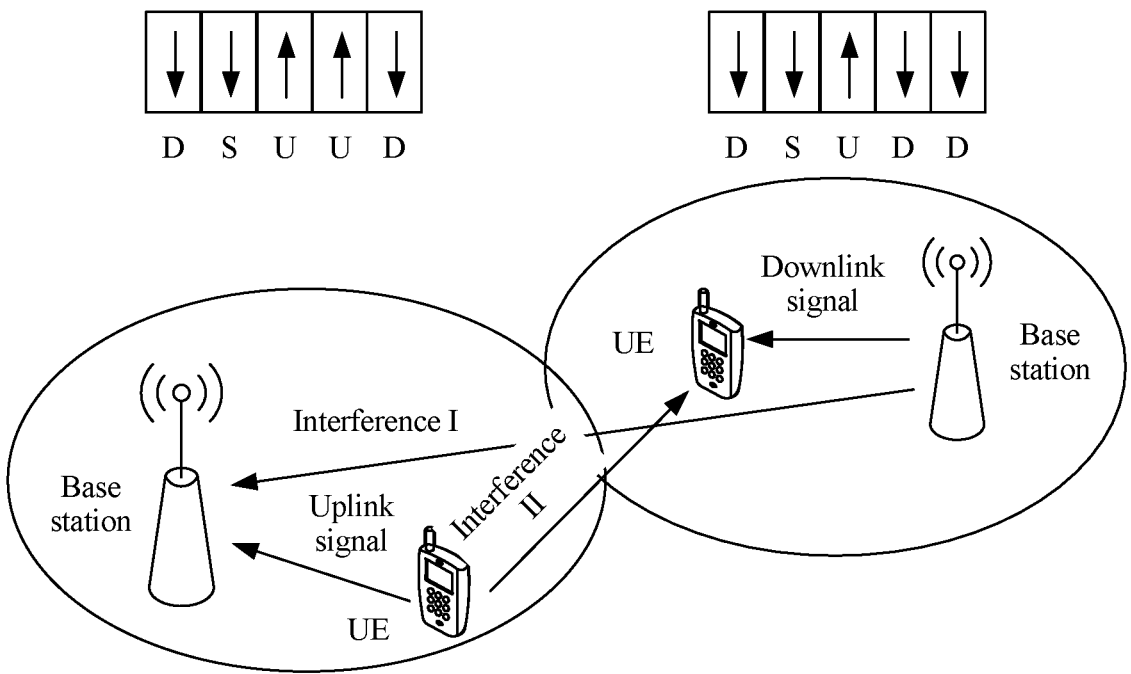
FIG. 3 is a third schematic diagram of an interference scenario.
Figure 4:
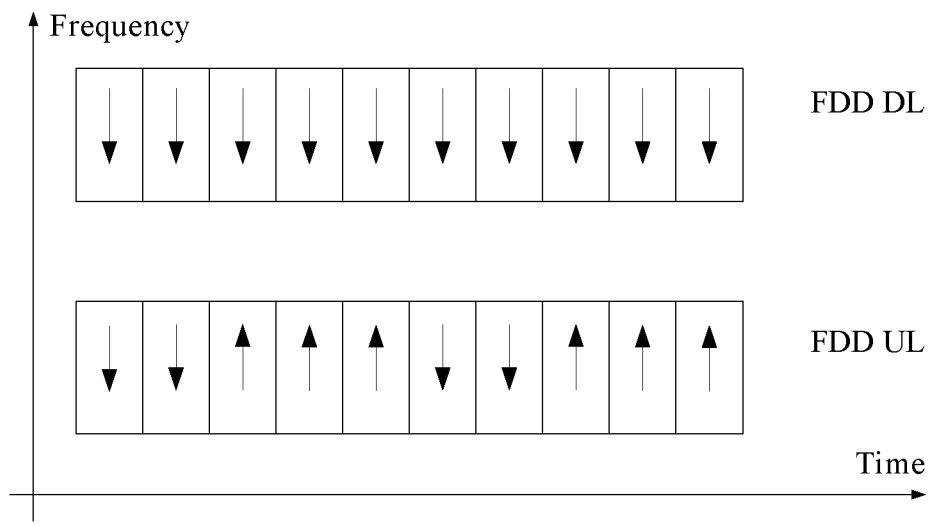
FIG. 4 is a schematic scenario diagram of dynamically sharing a spectrum using time division.
Figure 5:
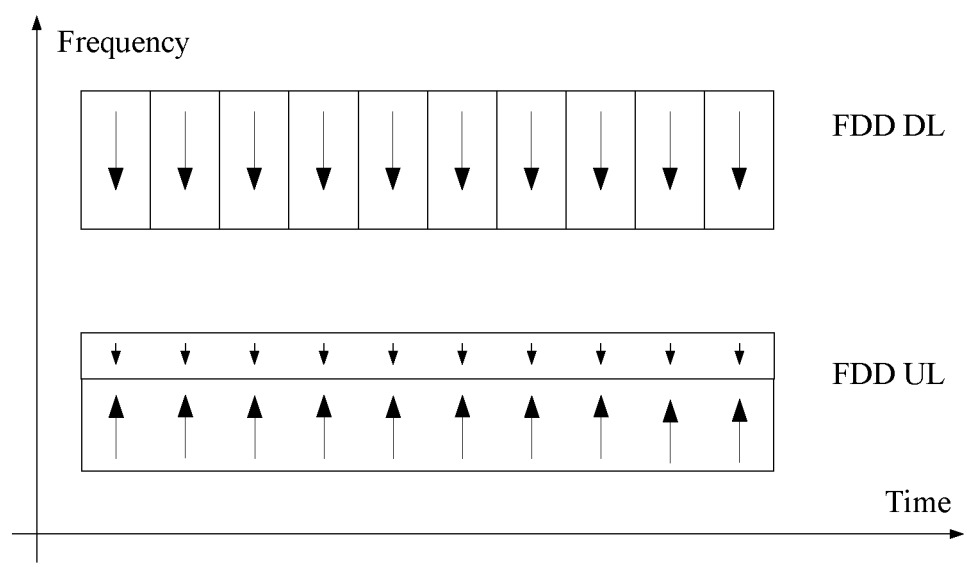
FIG. 5 is a schematic scenario diagram of dynamically sharing a spectrum using frequency division.

"Contradirectional transmission" in step S701 means transmission directions are different at a same time point, one direction corresponds to downlink transmission, and the other direction corresponds to uplink transmission, for example, transmission in FIG. 3, FIG. 4, or FIG. 5. Correspondingly, "codirectional transmission" means that transmission directions are the same at a same time point and are both corresponding to downlink transmission or uplink transmission, for example, transmission in FIG. 1 or FIG. 2.

It should be noted that, this description is applicable to the following embodiments, and details are not described again in the following embodiments. In addition, for a TDD system, when the first base station and the second base station do not need to communicate with each other, it can be seen from Table 1 that each subframe other than a subframe 0, a subframe 1, a subframe 2, or a subframe 5 may be determined as a contradirectional-transmission subframe, provided that transmission directions in a TDD uplink-downlink configuration corresponding to the first base station and a TDD uplink-downlink configuration corresponding to the second base station are different in the subframe. However, when the first base station and the second base station need to communicate with each other, after exchanging respective subframe configurations, the first base station and the second base station determine, as a contradirectional-transmission subframe, a subframe in which transmission directions are different.

The control channel indication information in step S701 may include the control channel indication information of the contradirectional-transmission frequency band on which the first cell is interfered with by the neighboring cell, or include the control channel indication information of the contradirectional-transmission subframe in which the first cell is interfered with by the neighboring cell, or include both the control channel indication information of the contradirectional-transmission frequency band on which the first cell is interfered with by the neighboring cell and the control channel indication information of the contradirectional-transmission subframe in which the first cell is interfered with by the neighboring cell. That is, "at least one" in step S701 may be any one piece of the listed information, or may be a combination of a plurality of pieces of the listed information. This is not limited in this embodiment of the present disclosure.

Optionally, in this embodiment of the present disclosure, the contradirectional-transmission frequency band may be a flexible half-duplex frequency band configured for contradirectional transmission, and the contradirectional-transmission subframe may be a subframe configured for contradirectional transmission on the contradirectional-transmission frequency band.

That is, the contradirectional-transmission frequency band in this embodiment of the present disclosure may be configured as an uplink frequency band for sending a downlink signal, for example, a frequency band shown in FIG. 4 or FIG. 5. This is not further limited in this embodiment of the present disclosure. The contradirectional-transmission subframe may be a subframe configured for contradirectional transmission on the contradirectional-transmission frequency band.

Optionally, in this embodiment of the present disclosure, the control channel indication information may include a PCFICH. Certainly, the control channel indication information may include other information. This is not limited in this embodiment of the present disclosure.

Optionally, that a first base station determines control channel indication information of a first cell (step S701) may further include determining, by the first base station, preconfigured information as the control channel indication information of the first cell.

For example, if the control channel indication information includes the PCFICH, the first base station may determine a preconfigured value as a value included in the PCFICH.

It should be noted that, the "preconfigured value" herein may be a value preconfigured based on an empirical value, or may be a value preconfigured based on a preferred value obtained after a plurality of experiments. This is not further limited in this embodiment of the present disclosure.

Preferably, in an ultra-dense network (UDN), each cell includes a few UEs. Therefore, the value included in the PCFICH may be set to 1. This description is applicable to the following embodiments, and details are not described again in the following embodiments.

Further, in step S702 in this embodiment of the present disclosure, the second base station herein is a base station of the neighboring cell in step S701. For example, if the neighboring cell in step S701 is the cell 2 managed by the base station 2, the second base station is further the base station 2, or if neighboring cells in step S701 are the cell 2 managed by the base station 2 and the cell 3 managed by the base station 3, both the base station 2 and the base station 3 may be referred to as second base stations.

Further, in step S704 in this embodiment of the present disclosure, the second base station may statically allocate a resource occupied by an uplink channel. For the second UE in the second base station, the resource that can be occupied by the uplink channel of the second UE may be a part or all of the resource that is statically allocated by the second base station and that is occupied by the uplink channel. This is not limited in this embodiment of the present disclosure. For example, the second base station may statically allocate five PRBs as the resource occupied by the uplink channel, and the information about the resource that can be occupied by the uplink channel of the second UE may be three PRBs.

The uplink channel may include at least one of the following channels a physical uplink shared channel (PUSCH) or a PUCCH.

Similarly, "at least one" herein may be any one piece of the listed information, or may be a combination of a plurality of pieces of the listed information. This is not limited in this embodiment of the present disclosure. That is, the uplink channel may further include the PUSCH, the PUCCH, or both the PUSCH and the PUCCH.

Further, in steps S705 to S707 in this embodiment of the present disclosure, after determining the information about the resource that can be occupied by the uplink channel of the second UE, the second base station may send the resource information to the second UE such that the UE can send the uplink data to the second base station according to the resource information.

Based on the interference suppression method provided in this embodiment of the present disclosure, in this embodiment of the present disclosure, the first base station may send the control channel indication information to the second base station after determining the control channel indication information of the first cell managed by the first base station. The control channel indication information includes the control channel indication information of the contradirectional-transmission frequency band on which the first cell is interfered with by the neighboring cell, and/or the control channel indication information of the contradirectional-transmission subframe in which the first cell is interfered with by the neighboring cell. In this way, after receiving the control channel indication information, the second base station may determine, according to the control channel indication information, the information about the resource that can be occupied by the uplink channel of the second UE in the cell managed by the second base station, and then, send the resource information to the second UE such that the second UE can send an uplink resource according to the resource information. The second base station learns of the control channel indication information of the first cell, and therefore can perform resource cooperation according to the control channel indication information. When determining the information about the resource that can be occupied by the uplink channel of the second UE, the second base station staggers the resource information and control information indicated by the control channel indication information of the first cell. Therefore, interference between an uplink signal and a downlink signal, that is, contradirectional-transmission interference, is suppressed, and network communication quality is improved.

Figure 8:
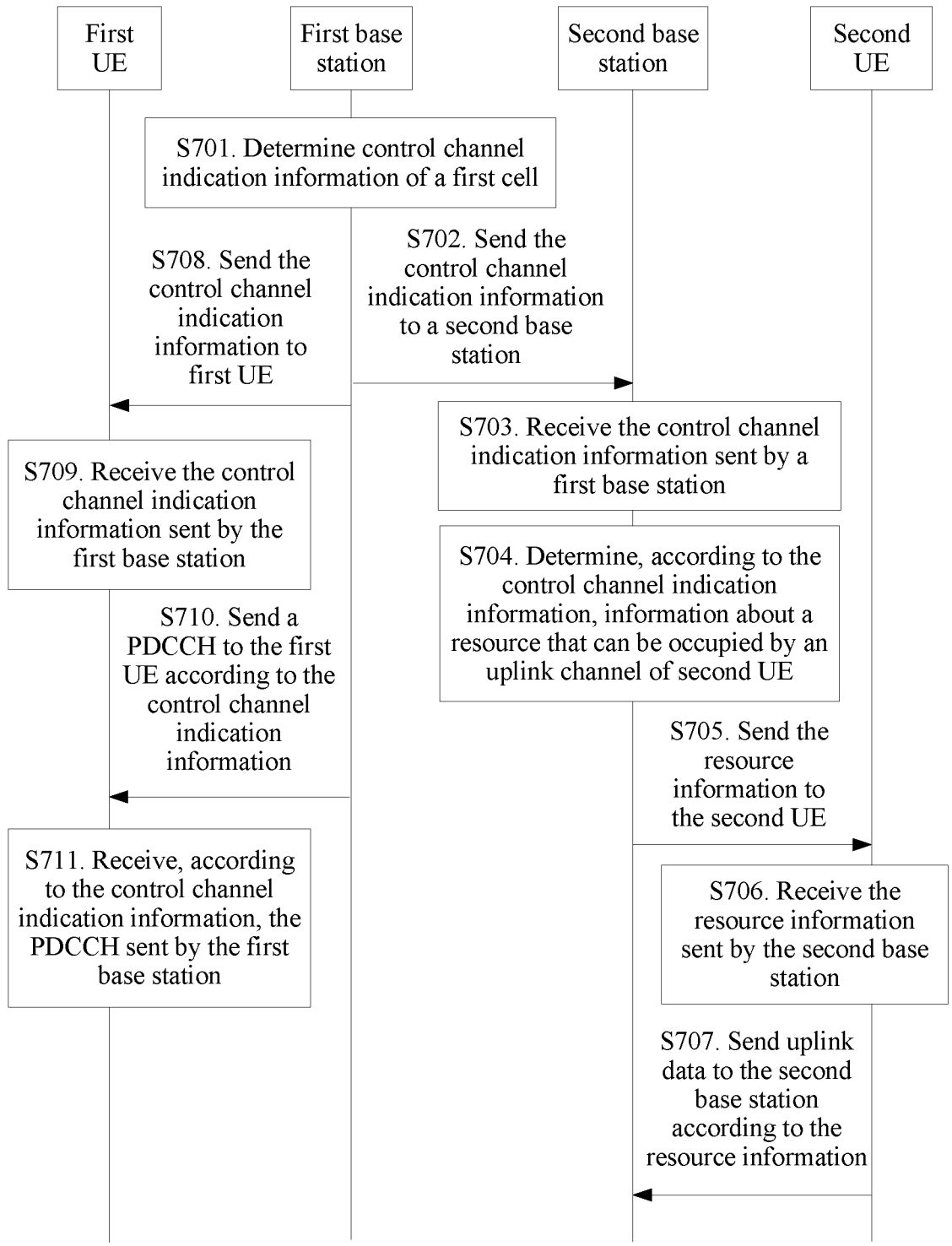
FIG. 8 is a second schematic flowchart of an interference suppression method according to an embodiment of the present disclosure.

Optionally, based on the embodiment shown in FIG. 7, after the first base station determines the control channel indication information of the first cell (step S701), the first base station may further interact with first UE (which may be any UE in the cell managed by the first base station, for example, the UE 1) in the cell managed by the first base station. As shown in FIG. 8, the method includes steps S708 to S711.

Step S708. The first base station sends the control channel indication information to first UE.

Step S709. The first UE receives the control channel indication information sent by the first base station.

Step S710. The first base station sends a PDCCH to the first UE according to the control channel indication information.

Step S711. The first UE receives, according to the control channel indication information, the PDCCH sent by the first base station.

Further, in step S708 in this embodiment of the present disclosure, the first base station may further send the control channel indication information to the first UE in any one of the following Manner 1 to Manner 4. Manner 1 to Manner 4 are respectively as follows.

Manner 1: The first base station sends the control channel indication information to the first UE in a preset codirectional-transmission subframe.

Manner 2: The first base station sends RRC signaling to the first UE in a preset codirectional-transmission subframe, where the RRC signaling includes the control channel indication information.

Manner 3: The first base station sends system information to the first UE, where the system information includes the control channel indication information.

Manner 4: The first base station sends a timeslot configuration to the first UE, where the timeslot configuration is used to indicate the control channel indication information.

Correspondingly, in step S709 in this embodiment of the present disclosure, that the first UE receives the control channel indication information sent by the first base station may include receiving, by the first UE in the preset codirectional-transmission subframe, the control channel indication information of the first cell that is sent by the first base station, receiving, by the first UE in the preset codirectional-transmission subframe, the RRC signaling sent by the first base station, where the RRC signaling includes the control channel indication information of the first cell, receiving, by the first UE, the system information sent by the first base station, where the system information includes the control channel indication information of the first cell, or receiving, by the first UE, the timeslot configuration sent by the first base station, where the timeslot configuration is used to indicate the control channel indication information of the first cell.

It should be noted that, the four implementations in which the first base station sends the control channel indication information to the first UE and the four implementations in which the first UE receives the control channel indication information sent by the first base station are only examples provided in this embodiment of the present disclosure. Certainly, there may be other possible implementations, which are not listed one by one in this embodiment of the present disclosure.

For Manner 4, that the timeslot configuration is used to indicate the control channel indication information further means that the timeslot configuration may implicitly reflect the control channel indication information. For example, the first UE may prestore a correspondence shown in Table 2. It is assumed that the timeslot configuration sent by the first base station to the first UE is a timeslot configuration 1. In this case, after receiving the timeslot configuration 1 sent by the first base station, the first UE may learn, according to Table 2, that the control channel indication information is information 1.

TABLE 2

| Control channel indication information | Timeslot configuration |
| --- | --- |
| Information 1 | Timeslot configuration 1 |
| Information 2 | Timeslot configuration 2 |
| Information 3 | Timeslot configuration 3 |
| . . . | . . . |

It should be noted, Table 2 is only an example to describe a form and content of the correspondence prestored in the first UE, and imposes no specific limitation on the form and content of the correspondence. In an actual application, the form and the content of the correspondence may be set according to an actual requirement.

Further, in step S710 in this embodiment of the present disclosure, if the control channel indication information further includes the PCFICH, that the first base station sends a PDCCH to the first UE according to the control channel indication information may further include, if the PCFICH includes a PCFICH of the contradirectional-transmission frequency band on which the first cell is interfered with by the neighboring cell, sending, by the first base station, the PDCCH to the first UE in the first j OFDM symbols of each subframe on the contradirectional-transmission frequency band, where j is a value included in the PCFICH, if the PCFICH includes a PCFICH of the contradirectional-transmission subframe in which the first cell is interfered with by the neighboring cell, sending, by the first base station, the PDCCH to the first UE in the first j OFDM symbols of the contradirectional-transmission subframe, or if the PCFICH includes a PCFICH of the contradirectional-transmission frequency band on which the first cell is interfered with by the neighboring cell and a PCFICH of the contradirectional-transmission subframe in which the first cell is interfered with by the neighboring cell, sending, by the first base station, the PDCCH to the first UE in the first j OFDM symbols of the contradirectional-transmission subframe on the contradirectional-transmission frequency band.

Correspondingly, in step S711 in this embodiment of the present disclosure, that the first UE receives, according to the control channel indication information, the PDCCH sent by the first base station may further include, if the PCFICH includes the PCFICH of the contradirectional-transmission frequency band on which the first cell is interfered with by the neighboring cell, receiving, by the first UE in the first j OFDM symbols of each subframe on the contradirectional-transmission frequency band, the PDCCH sent by the first base station, where j is a value included in the PCFICH, if the PCFICH includes the PCFICH of the contradirectional-transmission subframe in which the first cell is interfered with by the neighboring cell, receiving, by the first UE in the first j OFDM symbols of the contradirectional-transmission subframe, the PDCCH sent by the first base station, or if the PCFICH includes the PCFICH of the contradirectional-transmission frequency band on which the first cell is interfered with by the neighboring cell and the PCFICH of the contradirectional-transmission subframe in which the first cell is interfered with by the neighboring cell, receiving, by the first UE in the first j OFDM symbols of the contradirectional-transmission subframe on the contradirectional-transmission frequency band, the PDCCH sent by the first base station.

It should be noted that, in this embodiment of the present disclosure, there is no necessary execution sequence between steps S708 to S711 and steps S702 to S707. Steps S708 to S711 may be performed before steps S702 to S707 are performed. Alternatively, steps S702 to S707 may be performed before steps S708 to S711 are performed. Alternatively, steps S708 to S711 and steps S702 to S707 may be performed simultaneously. This is not limited in this embodiment of the present disclosure.

In this embodiment of the present disclosure, the first base station may further send the control channel indication information to the first UE in the cell managed by the first base station. In this way, the first UE can perform resource cooperation according to the control channel indication information to receive the PDCCH sent by the first base station. Therefore, interference between an uplink signal and a downlink signal, that is, contradirectional-transmission interference, is suppressed, and network communication quality is improved. Further, a disadvantage that the first UE cannot obtain the PDCCH due to interference from the neighboring cell is also resolved.

Figure 9A:
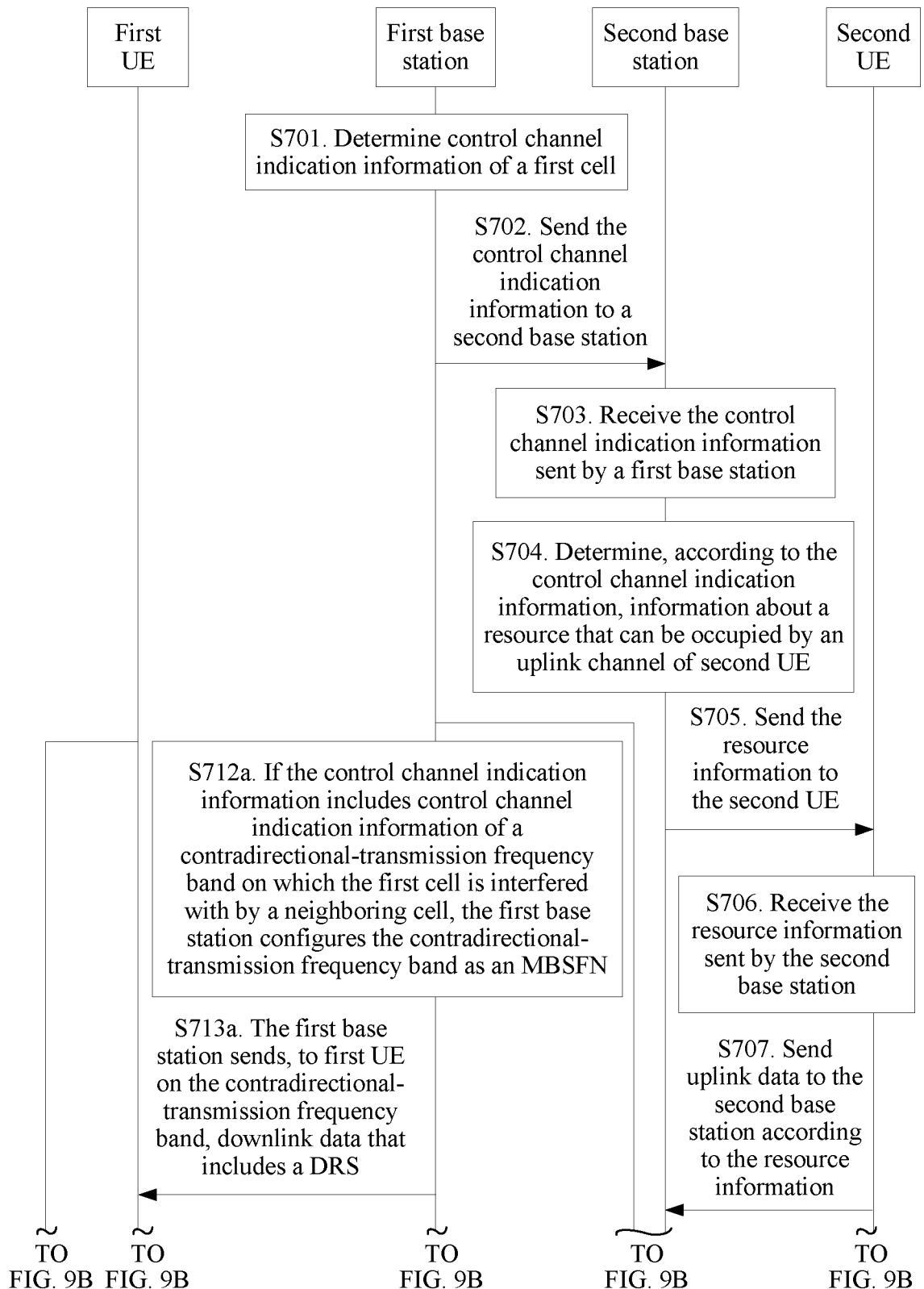
FIG. 9A, FIG. 9B, and FIG. 9C are third schematic flowcharts of an interference suppression method according to an embodiment of the present disclosure.
Figure 9B:
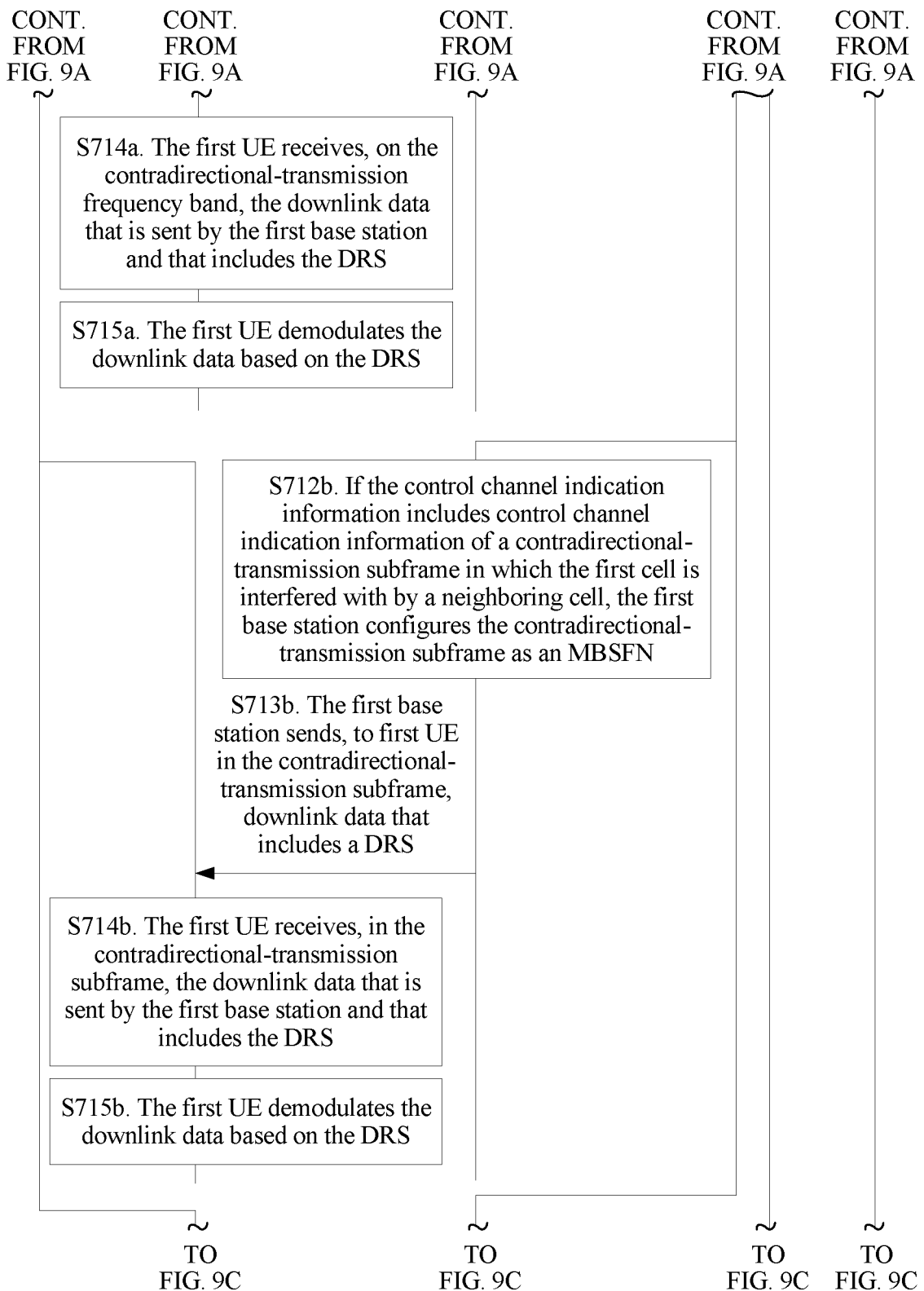
Figure 9C:
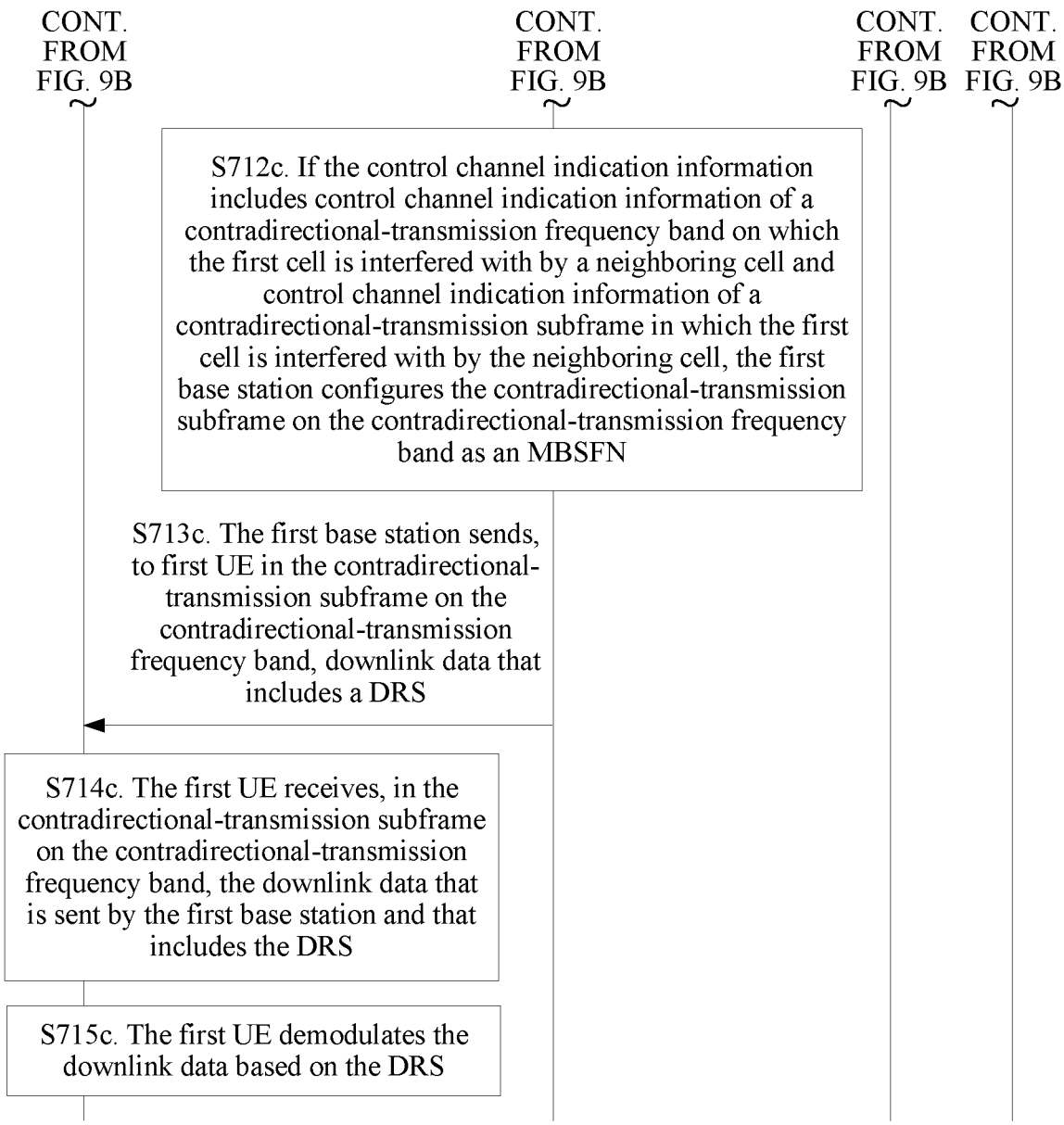

Optionally, based on the embodiment shown in FIG. 7 or FIG. 8, after the first base station determines the control channel indication information of the first cell (step S701), the first base station may further interact with first UE (which may be any UE in the cell managed by the first base station, for example, the UE 1) in the cell managed by the first base station. As shown in FIG. 9A, FIG. 9B, and FIG. 9C, the method includes steps S712a to S715a, steps S712b to S715b, or steps S712c to S715c.

Step S712a. If the control channel indication information includes control channel indication information of a contradirectional-transmission frequency band on which the first cell is interfered with by a neighboring cell, the first base station configures the contradirectional-transmission frequency band as an MBSFN.

Step S713a. The first base station sends, to first UE on the contradirectional-transmission frequency band, downlink data that includes a DRS.

Step S714a. The first UE receives, on the contradirectional-transmission frequency band, the downlink data that is sent by the first base station and that includes the DRS.

Step S715a. The first UE demodulates the downlink data based on the DRS.

Step S712b. If the control channel indication information includes control channel indication information of a contradirectional-transmission subframe in which the first cell is interfered with by a neighboring cell, the first base station configures the contradirectional-transmission subframe as an MBSFN.

Step S713b. The first base station sends, to first UE in the contradirectional-transmission subframe, downlink data that includes a DRS.

Step S714b. The first UE receives, in the contradirectional-transmission subframe, the downlink data that is sent by the first base station and that includes the DRS.

Step S715b. The first UE demodulates the downlink data based on the DRS.

Step S712c. If the control channel indication information includes control channel indication information of a contradirectional-transmission frequency band on which the first cell is interfered with by a neighboring cell and control channel indication information of a contradirectional-transmission subframe in which the first cell is interfered with by the neighboring cell, the first base station configures the contradirectional-transmission subframe on the contradirectional-transmission frequency band as an MBSFN.

Step S713c. The first base station sends, to first UE in the contradirectional-transmission subframe on the contradirectional-transmission frequency band, downlink data that includes a DRS.

Step S714c. The first UE receives, in the contradirectional-transmission subframe on the contradirectional-transmission frequency band, the downlink data that is sent by the first base station and that includes the DRS.

Step S715c. The first UE demodulates the downlink data based on the DRS.

It should be noted that, in this embodiment of the present disclosure, there is no necessary execution sequence between steps S702 to S707 and steps S712a to S715a, steps S712b to S715b, or steps S712c to S715c. Steps S702 to S707 may be performed before steps S712a to S715a, steps S712b to S715b, or steps S712c to S715c are performed. Alternatively, steps S712a to S715a, steps S712b to S715b, or steps S712c to S715c may be performed before steps S702 to S707 are performed. Alternatively, steps S702 to S707 and steps S712a to S715a, steps S712b to S715b, or steps S712c to S715c may be performed simultaneously. This is not limited in this embodiment of the present disclosure.

It should be noted that, the embodiment shown in FIG. 9A, FIG. 9B, and FIG. 9C is only an example description that is provided based on the embodiment shown in FIG. 7. Certainly, steps S712a to S715a, steps S712b to S715b, or steps S712c to S715c may be included in the embodiment shown in FIG. 8. This is not further limited in this embodiment of the present disclosure.

In this way, when the contradirectional-transmission frequency band and/or the contradirectional-transmission subframe are/is configured as an MBSFN, UE that performs communication on the contradirectional-transmission frequency band and/or in the contradirectional-transmission subframe can perform demodulation based on the DRS, without performing demodulation based on a cell-specific pilot CRS any more. Because power of the DRS is far lower than that of the CRS, the DRS causes less interference than the CRS, that is, both interference from the CRS and interference to the CRS are minimized. Therefore, contradirectional interference between the CRS and uplink transmission is reduced.

Optionally, in the embodiments shown in FIG. 7 to FIG. 9A, FIG. 9B, and FIG. 9C, if the control channel indication information further includes the PCFICH, that the second base station determines, according to the control channel indication information, information about a resource that can be occupied by an uplink channel of second UE (step S704) may further include, if the PCFICH includes the PCFICH of the contradirectional-transmission frequency band on which the first cell is interfered with by the neighboring cell, determining, by the second base station, the last (14-j) OFDM symbols of each subframe on the contradirectional-transmission frequency band as the information about the resource that can be occupied by the uplink channel of the second UE, where j is a value included in the PCFICH, if the PCFICH includes the PCFICH of the contradirectional-transmission subframe in which the first cell is interfered with by the neighboring cell, determining, by the second base station, the last (14-j) OFDM symbols of the contradirectional-transmission subframe as the information about the resource that can be occupied by the uplink channel of the second UE, or if the PCFICH includes the PCFICH of the contradirectional-transmission frequency band on which the first cell is interfered with by the neighboring cell and the PCFICH of the contradirectional-transmission subframe in which the first cell is interfered with by the neighboring cell, determining, by the second base station, the last (14-j) OFDM symbols of the contradirectional-transmission subframe on the contradirectional-transmission frequency band as the information about the resource that can be occupied by the uplink channel of the second UE.

Optionally, center UE and edge UE are distinguished in the embodiments of the present disclosure.

In the embodiments shown in FIG. 7 to FIG. 9A, FIG. 9B, and FIG. 9C, if the control channel indication information further includes the PCFICH, when the second UE is center UE in the second cell, that the second base station determines, according to the control channel indication information, information about a resource that can be occupied by an uplink channel of second UE (step S704) may further include, if the PCFICH includes the PCFICH of the contradirectional-transmission frequency band on which the first cell is interfered with by the neighboring cell, determining, by the second base station, all OFDM symbols of each subframe on the contradirectional-transmission frequency band as the information about the resource that can be occupied by the uplink channel of the second UE, if the PCFICH includes the PCFICH of the contradirectional-transmission subframe in which the first cell is interfered with by the neighboring cell, determining, by the second base station, all OFDM symbols of the contradirectional-transmission subframe as the information about the resource that can be occupied by the uplink channel of the second UE, or if the PCFICH includes the PCFICH of the contradirectional-transmission frequency band on which the first cell is interfered with by the neighboring cell and the PCFICH of the contradirectional-transmission subframe in which the first cell is interfered with by the neighboring cell, determining, by the second base station, all OFDM symbols of the contradirectional-transmission subframe on the contradirectional-transmission frequency band as the information about the resource that can be occupied by the uplink channel of the second UE.

Optionally, in the embodiments shown in FIG. 7 to FIG. 9A, FIG. 9B, and FIG. 9C, if the control channel indication information further includes the PCFICH, when the second UE is edge UE in the second cell, that the second base station determines, according to the control channel indication information, information about a resource that can be occupied by an uplink channel of second UE (step S704) may further include, if the PCFICH includes the PCFICH of the contradirectional-transmission frequency band on which the first cell is interfered with by the neighboring cell, determining, by the second base station, the last (14-j) OFDM symbols of each subframe on the contradirectional-transmission frequency band as the information about the resource that can be occupied by the uplink channel of the second UE, where j is a value included in the PCFICH, if the PCFICH includes the PCFICH of the contradirectional-transmission subframe in which the first cell is interfered with by the neighboring cell, determining, by the second base station, the last (14-j) OFDM symbols of the contra-directional-transmission subframe as the information about the resource that can be occupied by the uplink channel of the second UE, or if the PCFICH includes the PCFICH of the contradirectional-transmission frequency band on which the first cell is interfered with by the neighboring cell and the PCFICH of the contradirectional-transmission subframe in which the first cell is interfered with by the neighboring cell, determining, by the second base station, the last (14-j) OFDM symbols of the contradirectional-transmission subframe on the contradirectional-transmission frequency band as the information about the resource that can be occupied by the uplink channel of the second UE.

According to the implementations that are provided in the embodiments of the present disclosure and in which the second base station determines, according to the control channel indication information, the information about the resource that can be occupied by the uplink channel of the second UE, with reference to the specific implementations in which the first UE receives, according to the control channel indication information, the PDCCH sent by the first base station, it can be learned that during contradirectional transmission, an uplink signal and a downlink signal may be staggered in timeslots. Therefore, interference between the uplink signal and the downlink signal, that is, contradirectional-transmission interference, is suppressed, and network communication quality is improved.

Figure 10:
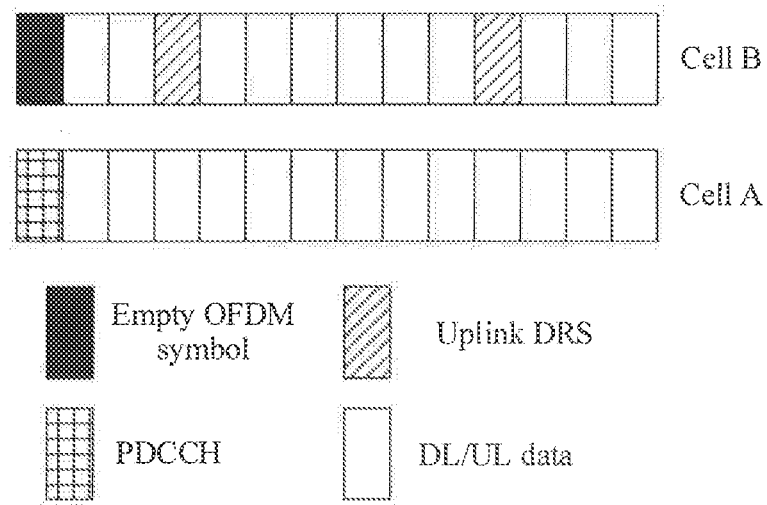
FIG. 10 is a schematic diagram of a contradirectional-transmission subframe according to an embodiment of the present disclosure.

For example, as shown in FIG. 10, a contradirectional-transmission subframe is shown. It is assumed that the contradirectional-transmission subframe is configured for downlink in a cell A, and is configured for uplink in a cell B that is a neighboring cell of the cell A. In a UDN, each cell includes a few UEs. It is assumed that a value included in a PCFICH of the cell A in the contradirectional-transmission subframe is set to 1, that is, j=1. In this case, a PDCCH for UE in the cell A is transmitted only in the first OFDM symbol. In the cell B, 13 OFDM symbols may be configured for edge UE in the cell B to send an uplink channel, or all OFDM symbols may be configured for center UE in the cell B to send an uplink channel.

An uplink DRS in FIG. 10 may be transmitted on the uplink channel (such as a PUCCH and/or a PUSCH).

In this way, the uplink channel in the cell B and the PDCCH in the cell A may be staggered in timeslots. Therefore, interference between an uplink signal and a downlink signal, that is, contradirectional-transmission interference, is suppressed, and network communication quality is improved.

It should be noted that, in the embodiments of the present disclosure, it may be considered that interference caused by center UE to downlink receiving of UE in a neighboring cell is acceptable or tolerable. That is, it may be considered that the center UE causes little interference to a control channel, and therefore the center UE can normally perform uplink transmission.

Optionally, in the embodiments of the present disclosure, center UE and edge UE may be determined in the following manner, including receiving, by the second base station, a reference signal parameter sent by the second UE, where the reference signal parameter includes at least one of the following parameters, an RSRP value, or an RSRQ value, if a value of at least one parameter in the reference signal parameter is not less than a preset threshold, determining, by the second base station, that the second UE is center UE in the second cell, or if values of all parameters in the reference signal parameter are less than the preset threshold, determining, by the second base station, that the second UE is edge UE in the second cell.

As described above, "at least one" herein may be any one piece of the listed information, or may be a combination of a plurality of pieces of the listed information. This is not further limited in the embodiments of the present disclosure. That is, the reference signal parameter may further include the RSRP value, the RSRQ value, or both the RSRP value and the RSRQ value.

When the reference signal parameter includes the RSRP value, if the RSRP value is not less than the preset threshold, the second base station determines that the second UE is center UE in the second cell. Otherwise, the second base station determines that the second UE is edge UE.

When the reference signal parameter includes the RSRQ value, if the RSRQ value is not less than the preset threshold, the second base station determines that the second UE is center UE in the second cell. Otherwise, the second base station determines that the second UE is edge UE.

When the reference signal parameter includes both the RSRP value and the RSRQ value, and when either the RSRP value or the RSRQ value is not less than the preset threshold, the second base station determines that the second UE is center UE in the second cell. If both the RSRP value and the RSRQ value are less than the preset threshold, the second base station determines that the second UE is edge UE in the second cell.

It should be noted that, in the embodiments of the present disclosure, the preset threshold may be an empirical value, or may be a preferred value obtained after a plurality of experiments. This is not limited in the embodiments of the present disclosure.

It should be noted that, the foregoing provides only an example of a manner of determining the center UE and the edge UE. Certainly, the center UE and the edge UE may be determined in another manner. This is not further limited in the embodiments of the present disclosure.

Figure 11:
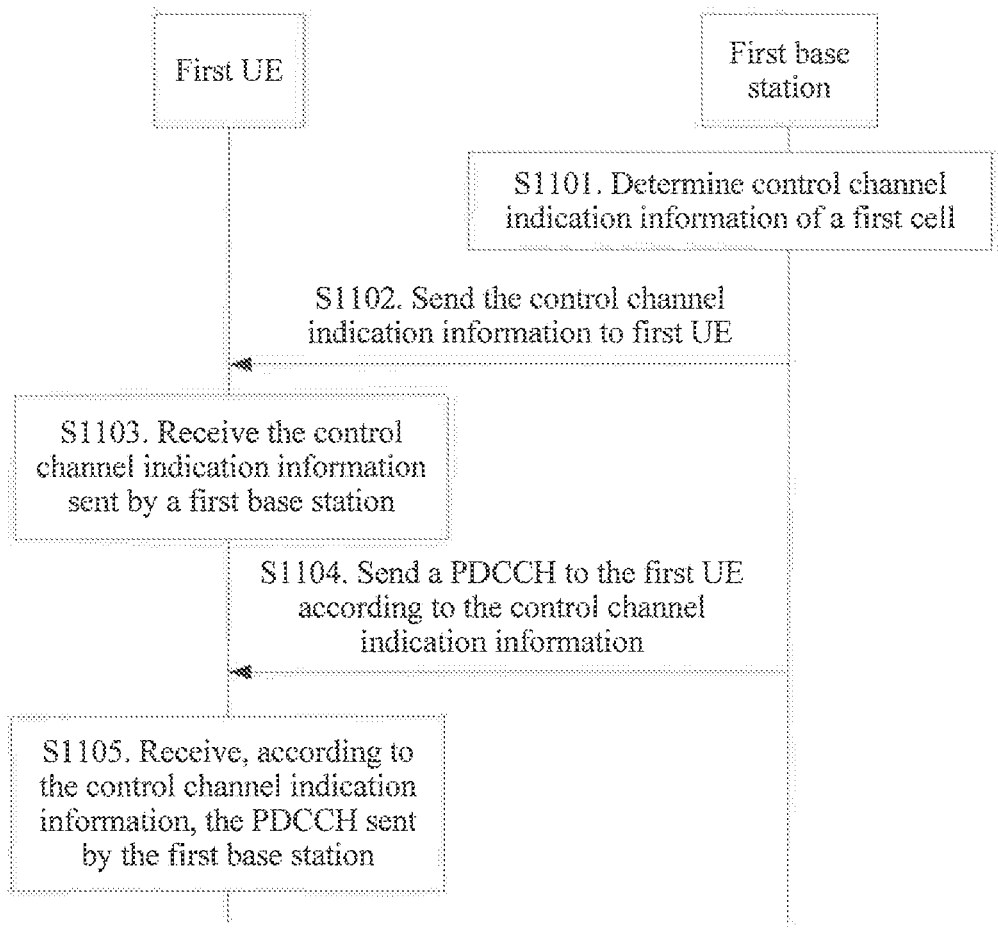
FIG. 11 is a fourth schematic flowchart of an interference suppression method according to an embodiment of the present disclosure.

Optionally, based on the interference suppression system shown in FIG. 6, an embodiment of the present disclosure further provides an interference suppression method. The following example is used for description. A first base station interacts with first UE (which may be any UE in a cell managed by the first base station, for example, the UE 1) in the cell managed by the first base station. As shown in FIG. 11, the method includes steps S1101 to S1105.

Step S1101. A first base station determines control channel indication information of a first cell.

The first cell is any one of cells managed by the first base station, and the control channel indication information may include at least one piece of the following information control channel indication information of a contradirectional-transmission frequency band on which the first cell is interfered with by a neighboring cell, or control channel indication information of a contradirectional-transmission subframe in which the first cell is interfered with by a neighboring cell.

Step S1102. The first base station sends the control channel indication information to first UE.

Step S1103. The first UE receives the control channel indication information sent by the first base station.

Step S1104. The first base station sends a PDCCH to the first UE according to the control channel indication information.

Step S1105. The first UE receives, according to the control channel indication information, the PDCCH sent by the first base station.

Further, for descriptions of steps S1101 to S1105 in this embodiment of the present disclosure, refer to the related descriptions in the embodiment shown in FIG. 7 or FIG. 8. Details are not described herein again in this embodiment of the present disclosure.

Optionally, in this embodiment of the present disclosure, after the first base station determines the control channel indication information of the first cell (step S1101), the method may further include steps S712a to S715a, steps S712b to S715b, or steps S712c to S715c in the embodiment shown in FIG. 9A, FIG. 9B, and FIG. 9C. Details are not described herein again in this embodiment of the present disclosure. For the details, refer to the related descriptions in the embodiment shown in FIG. 9A, FIG. 9B, and FIG. 9C.

Different from that in the embodiments shown in FIG. 7 to FIG. 9A, FIG. 9B, and FIG. 9C, in the interference suppression method provided in this embodiment of the present disclosure, there is no interaction between the first base station and a second base station. After determining the control channel indication information of the first cell, the first base station directly sends the control channel indication information to the first UE in the cell managed by the first base station. In this way, the first UE can perform resource cooperation according to the control channel indication information, to receive the PDCCH sent by the first base station. Therefore, interference between an uplink signal and a downlink signal, that is, contradirectional-transmission interference, is suppressed, and network communication quality is improved. Further, a disadvantage that the first UE cannot obtain the PDCCH due to interference from the neighboring cell is also resolved.

Figure 12:
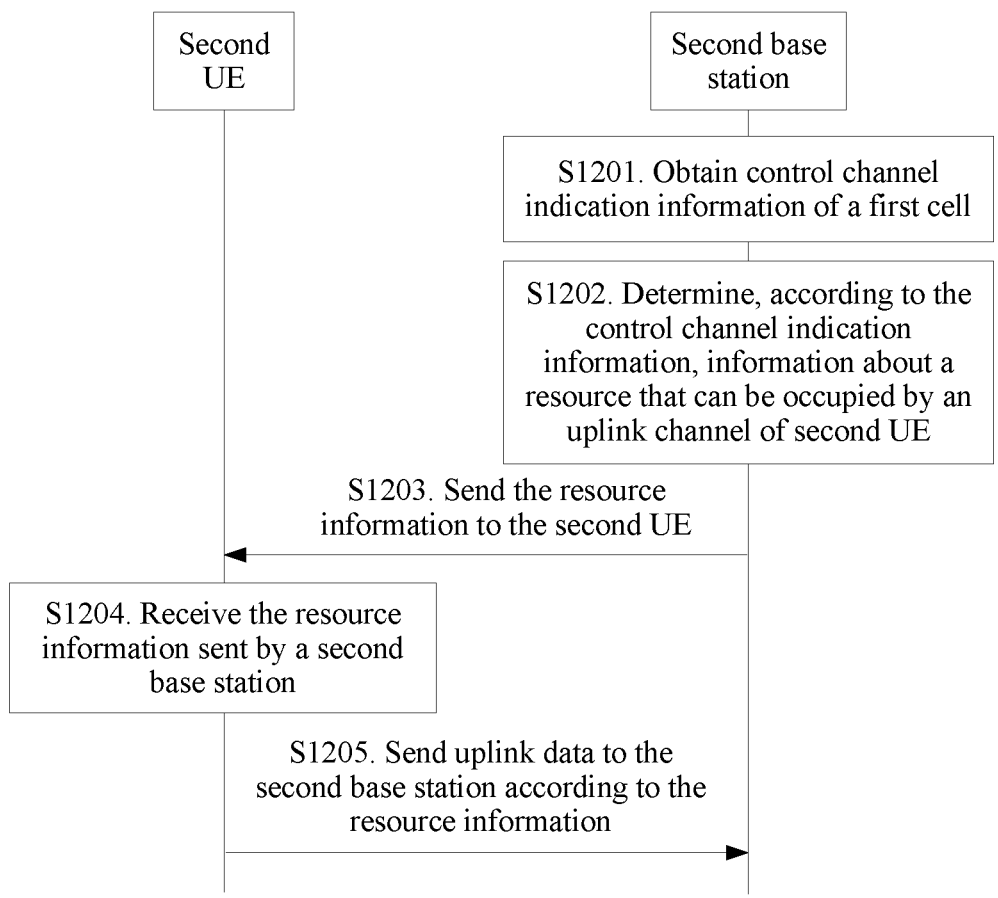
FIG. 12 is a fifth schematic flowchart of an interference suppression method according to an embodiment of the present disclosure.

Optionally, based on the interference suppression system shown in FIG. 6, an embodiment of the present disclosure further provides an interference suppression method. The following example is used for description A second base station interacts with second UE (which may be any UE in a cell managed by the second base station, for example, the second UE may be the UE 3 when the second base station is the base station 2) in the cell managed by the second base station. As shown in FIG. 12, the method includes steps S1201 to S1205.

Step S1201. A second base station obtains control channel indication information of a first cell.

The first cell is any one of cells managed by a first base station, and the control channel indication information may include at least one piece of the following information of control channel indication information of a contradirectional-transmission frequency band on which the first cell is interfered with by a neighboring cell, or control channel indication information of a contradirectional-transmission subframe in which the first cell is interfered with by a neighboring cell. The neighboring cell includes a second cell, and the second cell is any one of cells managed by the second base station.

Step S1202. The second base station determines, according to the control channel indication information, information about a resource that can be occupied by an uplink channel of second UE.

Step S1203. The second base station sends the resource information to the second UE.

Step S1204. The second UE receives the resource information sent by the second base station.

Step S1205. The second UE sends uplink data to the second base station according to the resource information.

Further, in step S1201 in this embodiment of the present disclosure, the second base station may obtain the control channel indication information of the first cell in the following manner in which the second base station interacts with the first base station in the embodiment shown in FIG. 7.

The second base station receives the control channel indication information of the first cell that is sent by the first base station.

The implementation is not described in detail again in this embodiment of the present disclosure. For details, refer to the related descriptions in the embodiment shown in FIG. 7.

Different from that in the embodiment shown in FIG. 7, in the interference suppression method provided in this embodiment of the present disclosure, there may be no interaction between the first base station and the second base station. In this case, that a second base station obtains control channel indication information of a first cell may include determining, by the second base station, preconfigured information as the control channel indication information of the first cell.

For example, if the control channel indication information includes a PCFICH, the second base station may determine a preconfigured value as a value included in the PCFICH.

Further, for detailed descriptions of steps S1202 to S1205 in this embodiment of the present disclosure, refer to the embodiment shown in FIG. 7. Details are not described herein again in this embodiment of the present disclosure.

Based on the interference suppression method provided in this embodiment of the present disclosure, in this embodiment of the present disclosure, after determining the control channel indication information of the first cell managed by the first base station, the second base station may determine, according to the control channel indication information, the information about the resource that can be occupied by the uplink channel of the second UE in the cell managed by the second base station, and then, send the resource information to the second UE such that the second UE can send an uplink resource according to the resource information. The second base station learns of the control channel indication information of the first cell, and therefore can perform resource cooperation according to the control channel indication information. When determining the information about the resource that can be occupied by the uplink channel of the second UE, the second base station staggers the resource information and control information indicated by the control channel indication information of the first cell. Therefore, interference between an uplink signal and a downlink signal, that is, contradirectional-transmission interference, is suppressed, and network communication quality is improved.

Figure 13A:
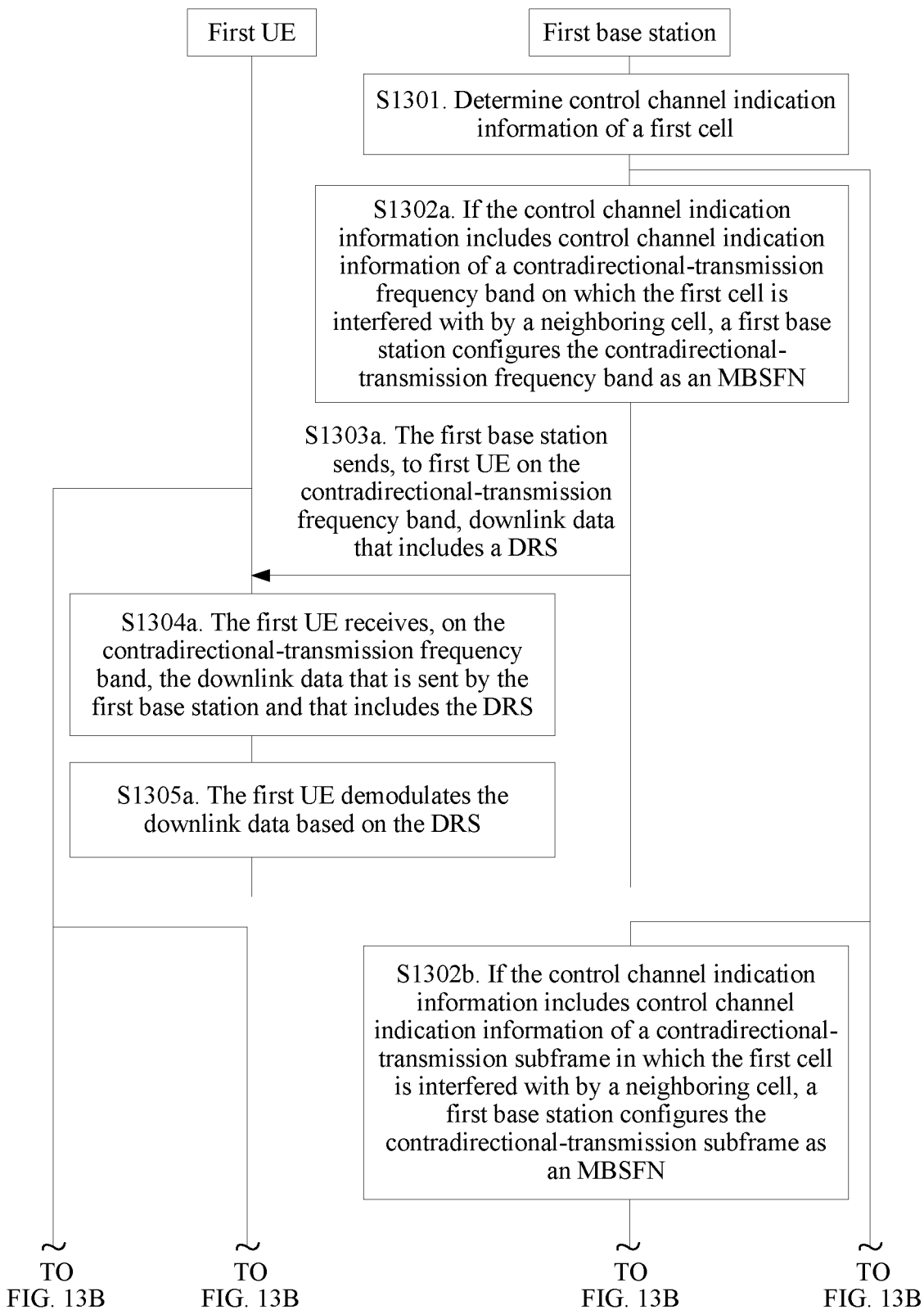
FIG. 13A and FIG. 13B are sixth schematic flowcharts of an interference suppression method according to an embodiment of the present disclosure.
Figure 13B:
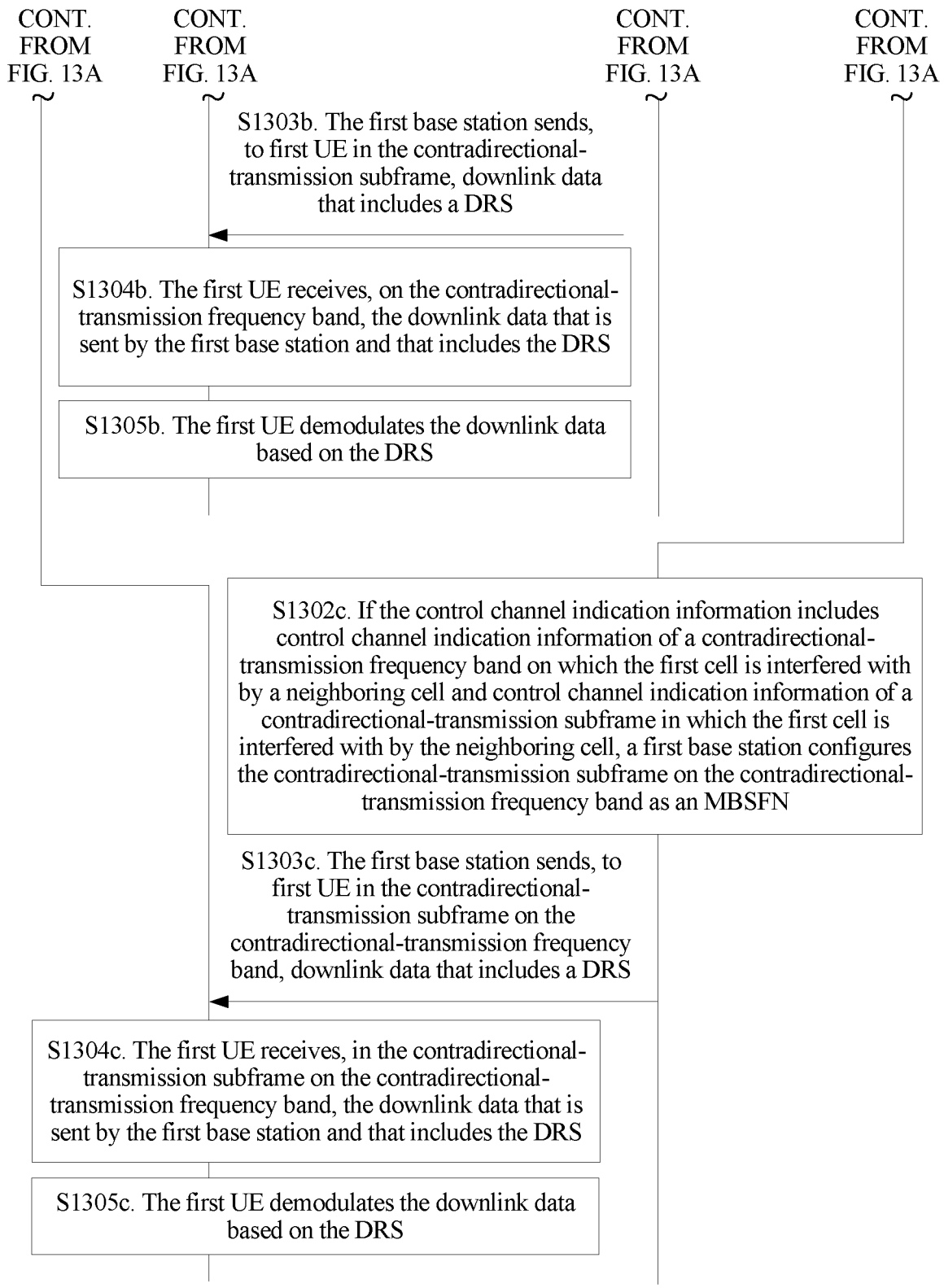

Optionally, based on the interference suppression system shown in FIG. 6, an embodiment of the present disclosure further provides an interference suppression method. The following example is used for description. A first base station interacts with first UE (which may be any UE in a cell managed by the first base station, for example, the UE 1) in the cell managed by the first base station. As shown in FIG. 13A and FIG. 13B, the method includes step S1301 and steps 1302a to S1305a, or includes step S1301 and steps 1302b to S1305b, or includes step S1301 and steps 1302c to S1305c.

Step S1301. A first base station determines control channel indication information of a first cell.

The first cell is any one of cells managed by the first base station, and the control channel indication information may include at least one piece of the following information of control channel indication information of a contradirectional-transmission frequency band on which the first cell is interfered with by a neighboring cell, or control channel indication information of a contradirectional-transmission subframe in which the first cell is interfered with by a neighboring cell.

Step S1302a. If the control channel indication information includes control channel indication information of a contradirectional-transmission frequency band on which the first cell is interfered with by a neighboring cell, the first base station configures the contradirectional-transmission frequency band as an MBSFN.

Step S1303a. The first base station sends, to first UE on the contradirectional-transmission frequency band, downlink data that includes a DRS.

Step S1304a. The first UE receives, on the contradirectional-transmission frequency band, the downlink data that is sent by the first base station and that includes the DRS.

Step S1305a. The first UE demodulates the downlink data based on the DRS.

Step S1302b. If the control channel indication information includes control channel indication information of a contradirectional-transmission subframe in which the first cell is interfered with by a neighboring cell, the first base station configures the contradirectional-transmission subframe as an MBSFN.

Step S1303b. The first base station sends, to first UE in the contradirectional-transmission subframe, downlink data that includes a DRS.

Step S1304b. The first UE receives, in the contradirectional-transmission subframe, the downlink data that is sent by the first base station and that includes the DRS.

Step S1305b. The first UE demodulates the downlink data based on the DRS.

Step S1302c. If the control channel indication information includes control channel indication information of a contradirectional-transmission frequency band on which the first cell is interfered with by a neighboring cell and control channel indication information of a contradirectional-transmission subframe in which the first cell is interfered with by the neighboring cell, the first base station configures the contradirectional-transmission subframe on the contradirectional-transmission frequency band as an MBSFN.

Step S1303c. The first base station sends, to first UE in the contradirectional-transmission subframe on the contradirectional-transmission frequency band, downlink data that includes a DRS.

Step S1304c. The first UE receives, in the contradirectional-transmission subframe on the contradirectional-transmission frequency band, the downlink data that is sent by the first base station and that includes the DRS.

Step S1305c. The first UE demodulates the downlink data based on the DRS.

In this way, when the contradirectional-transmission frequency band and/or the contradirectional-transmission subframe are/is configured as an MBSFN, UE that performs communication on the contradirectional-transmission frequency band and/or in the contradirectional-transmission subframe can perform demodulation based on the DRS, without performing demodulation based on a cell-specific pilot CRS any more. Because power of the DRS is far lower than that of the CRS, the DRS causes less interference than the CRS, that is, both interference from the CRS and interference to the CRS are minimized. Therefore, contradirectional interference between the CRS and uplink transmission is reduced.

Figure 14:
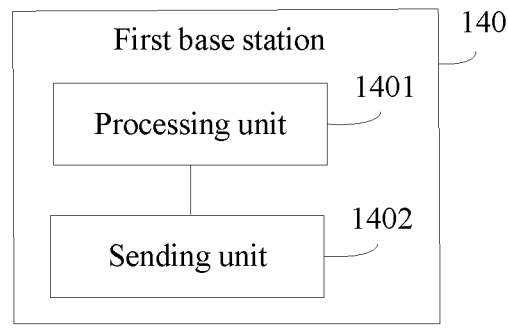
FIG. 14 is a first schematic structural diagram of a first base station according to an embodiment of the present disclosure.

As shown in FIG. 14, an embodiment of the present disclosure provides an interference suppression apparatus. The apparatus may be a first base station 140 configured to perform the steps performed by the first base station in the interference suppression methods shown in FIG. 7 to FIG. 9A, FIG. 9B, and FIG. 9C or the steps performed by the first base station in the interference suppression method shown in FIG. 11. The first base station 140 may include units corresponding to the corresponding steps, for example, may include a processing unit 1401 and a sending unit 1402.

The processing unit 1401 is configured to determine control channel indication information of a first cell. The first cell is any one of cells managed by the first base station 140, and the control channel indication information includes at least one piece of the following information of control channel indication information of a contradirectional-transmission frequency band on which the first cell is interfered with by a neighboring cell, or control channel indication information of a contradirectional-transmission subframe in which the first cell is interfered with by a neighboring cell.

When the first base station 140 is configured to perform the steps performed by the first base station in the interference suppression methods shown in FIG. 7 to FIG. 9A, FIG. 9B, and FIG. 9C, the sending unit 1402 is configured to send the control channel indication information to a second base station. The second base station is a base station of the neighboring cell.

When the first base station 140 is configured to perform the steps performed by the first base station in the interference suppression method shown in FIG. 11, the sending unit 1402 is configured to send the control channel indication information to first UE. The first UE is any UE in the first cell.

Optionally, when the first base station 140 is configured to perform the steps performed by the first base station in the interference suppression methods shown in FIG. 7 to FIG. 9A, FIG. 9B, and FIG. 9C, the sending unit 1402 is further configured to send the control channel indication information to first UE after the processing unit 1401 determines the control channel indication information of the first cell. The first UE is any UE in the first cell.

Optionally, when the first base station 140 is configured to perform the steps performed by the first base station in the interference suppression methods shown in FIG. 7 to FIG. 9A, FIG. 9B, and FIG. 9C or the steps performed by the first base station in the interference suppression method shown in FIG. 11, the sending unit 1402 is further configured to send the control channel indication information to the first UE in a preset codirectional-transmission subframe, send RRC signaling to the first UE in a preset codirectional-transmission subframe, where the RRC signaling includes the control channel indication information, send system information to the first UE, where the system information includes the control channel indication information, or send a timeslot configuration to the first UE, where the timeslot configuration is used to indicate the control channel indication information.

Optionally, when the first base station 140 is configured to perform the steps performed by the first base station in the interference suppression methods shown in FIG. 7 to FIG. 9A, FIG. 9B, and FIG. 9C or the steps performed by the first base station in the interference suppression method shown in FIG. 11, the sending unit 1402 is further configured to send a PDCCH to the first UE according to the control channel indication information after the processing unit 1401 determines the control channel indication information of the first cell.

Further, optionally, the control channel indication information includes a PCFICH.

The sending unit 1402 is further configured to, if the PCFICH includes a PCFICH of the contradirectional-transmission frequency band on which the first cell is interfered with by the neighboring cell, send the PDCCH to the first UE in the first j OFDM symbols of each subframe on the contradirectional-transmission frequency band, where j is a value included in the PCFICH, if the PCFICH includes a PCFICH of the contradirectional-transmission subframe in which the first cell is interfered with by the neighboring cell, send the PDCCH to the first UE in the first j OFDM symbols of the contradirectional-transmission subframe, or if the PCFICH includes a PCFICH of the contradirectional-transmission frequency band on which the first cell is interfered with by the neighboring cell and a PCFICH of the contradirectional-transmission subframe in which the first cell is interfered with by the neighboring cell, send the PDCCH to the first UE in the first j OFDM symbols of the contradirectional-transmission subframe on the contradirectional-transmission frequency band.

Optionally, when the first base station 140 is configured to perform the steps performed by the first base station in the interference suppression methods shown in FIG. 7 to FIG. 9A, FIG. 9B, and FIG. 9C or the steps performed by the first base station in the interference suppression method shown in FIG. 11, the processing unit 1401 is further configured to, after determining the control channel indication information of the first cell, if the control channel indication information includes the control channel indication information of the contradirectional-transmission frequency band on which the first cell is interfered with by the neighboring cell, configure the contradirectional-transmission frequency band as an MBSFN, and the sending unit 1402 is further configured to send, to the first UE on the contradirectional-transmission frequency band, downlink data that includes a DRS, where the first UE is any UE in the first cell.

Alternatively, the processing unit 1401 is further configured to, if the control channel indication information includes the control channel indication information of the contradirectional-transmission subframe in which the first cell is interfered with by the neighboring cell, configure the contradirectional-transmission subframe as an MBSFN, and the sending unit 1402 is further configured to send, to the first UE on the contradirectional-transmission frequency band, downlink data that includes a DRS.

Alternatively, the processing unit 1401 is further configured to, if the control channel indication information includes the control channel indication information of the contradirectional-transmission frequency band on which the first cell is interfered with by the neighboring cell and the control channel indication information of the contradirectional-transmission subframe in which the first cell is interfered with by the neighboring cell, configure, as an MBSFN, the contradirectional-transmission subframe on the contradirectional-transmission frequency band on which the first cell is interfered with by the neighboring cell, and the sending unit 1402 is further configured to send, to the first UE in the contradirectional-transmission subframe on the contradirectional-transmission frequency band, downlink data that includes a DRS.

Optionally, in this embodiment of the present disclosure, the contradirectional-transmission frequency band may be a flexible half-duplex frequency band configured for contradirectional transmission, and the contradirectional-transmission subframe may be a subframe configured for contradirectional transmission on the contradirectional-transmission frequency band.

Optionally, in this embodiment of the present disclosure, the processing unit 1401 may be further configured to determine preconfigured information as the control channel indication information of the first cell.

It can be understood that, the first base station 140 in this embodiment of the present disclosure may be corresponding to the first base station in the interference suppression methods shown in FIG. 7 to FIG. 9A, FIG. 9B, and FIG. 9C or the first base station in the interference suppression method shown in FIG. 11. In addition, division, functions, and/or the like of the units in the first base station 140 in this embodiment of the present disclosure are all used to implement the procedures of the interference suppression methods shown in FIG. 7 to FIG. 9A, FIG. 9B, and FIG. 9C or the procedure of the interference suppression method shown in FIG. 11. For brevity, details are not described herein again.

The first base station 140 in this embodiment of the present disclosure may be configured to perform the foregoing method procedures. Therefore, for technical effects that can be obtained by the first base station 140, refer to the foregoing method embodiments. Details are not described in this embodiment of the present disclosure.

Figure 15:
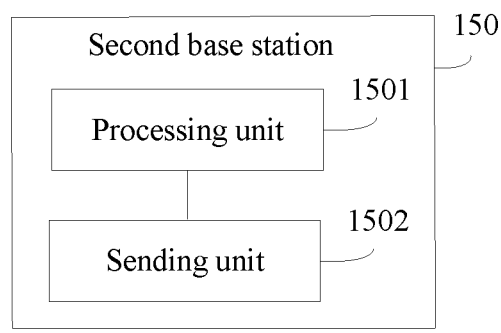
FIG. 15 is a first schematic structural diagram of a second base station according to an embodiment of the present disclosure.

As shown in FIG. 15, an embodiment of the present disclosure provides an interference suppression apparatus. The apparatus may be a second base station 150 configured to perform the steps performed by the second base station in the interference suppression methods shown in FIG. 7 to FIG. 9A, FIG. 9B, and FIG. 9C and the steps performed by the second base station in the interference suppression method shown in FIG. 12. The second base station 150 may include units corresponding to the corresponding steps, for example, may include a processing unit 1501 and a sending unit 1502.

The processing unit 1501 is configured to obtain control channel indication information of a first cell. The first cell is any one of cells managed by a first base station, and the control channel indication information includes at least one piece of the following information of control channel indication information of a contradirectional-transmission frequency band on which the first cell is interfered with by a neighboring cell, or control channel indication information of a contradirectional-transmission subframe in which the first cell is interfered with by a neighboring cell. The neighboring cell includes a second cell, and the second cell is any one of cells managed by the second base station 150.

The processing unit 1501 is further configured to determine, according to the control channel indication information, information about a resource that can be occupied by an uplink channel of second UE. The second UE is any UE in the second cell.

The sending unit 1502 is configured to send the resource information to the second UE.

Optionally, the control channel indication information includes a PCFICH.

The processing unit 1501 is further configured to, if the PCFICH includes a PCFICH of the contradirectional-transmission frequency band on which the first cell is interfered with by the neighboring cell, determine the last (14-j) OFDM symbols of each subframe on the contradirectional-transmission frequency band as the information about the resource that can be occupied by the uplink channel of the second UE, where j is a value included in the PCFICH, if the PCFICH includes a PCFICH of the contradirectional-transmission subframe in which the first cell is interfered with by the neighboring cell, determine the last (14-j) OFDM symbols of the contradirectional-transmission subframe as the information about the resource that can be occupied by the uplink channel of the second UE, or if the PCFICH includes a PCFICH of the contradirectional-transmission frequency band on which the first cell is interfered with by the neighboring cell and a PCFICH of the contradirectional-transmission subframe in which the first cell is interfered with by the neighboring cell, determine the last (14-j) OFDM symbols of the contradirectional-transmission subframe on the contradirectional-transmission frequency band as the information about the resource that can be occupied by the uplink channel of the second UE.

Optionally, the control channel indication information includes a PCFICH.

If the second UE is center UE in the second cell, the processing unit 1501 is further configured to, if the PCFICH includes a PCFICH of the contradirectional-transmission frequency band on which the first cell is interfered with by the neighboring cell, determine all OFDM symbols of each subframe on the contradirectional-transmission frequency band as the information about the resource that can be occupied by the uplink channel of the second UE, if the PCFICH includes a PCFICH of the contradirectional-transmission subframe in which the first cell is interfered with by the neighboring cell, determine all OFDM symbols of the contradirectional-transmission subframe as the information about the resource that can be occupied by the uplink channel of the second UE, or if the PCFICH includes a PCFICH of the contradirectional-transmission frequency band on which the first cell is interfered with by the neighboring cell and a PCFICH of the contradirectional-transmission subframe in which the first cell is interfered with by the neighboring cell, determine all OFDM symbols of the contradirectional-transmission subframe on the contradirectional-transmission frequency band as the information about the resource that can be occupied by the uplink channel of the second UE.

Optionally, if the second UE is edge UE in the second cell, the processing unit 1501 is further configured to, if the PCFICH includes a PCFICH of the contradirectional-transmission frequency band on which the first cell is interfered with by the neighboring cell, determine the last (14-j) OFDM symbols of each subframe on the contradirectional-transmission frequency band as the information about the resource that can be occupied by the uplink channel of the second UE, where j is a value included in the PCFICH, if the PCFICH includes a PCFICH of the contradirectional-transmission subframe in which the first cell is interfered with by the neighboring cell, determine the last (14-j) OFDM symbols of the contradirectional-transmission subframe as the information about the resource that can be occupied by the uplink channel of the second UE, or if the PCFICH includes a PCFICH of the contradirectional-transmission frequency band on which the first cell is interfered with by the neighboring cell and a PCFICH of the contradirectional-transmission subframe in which the first cell is interfered with by the neighboring cell, determine the last (14-j) OFDM symbols of the contradirectional-transmission subframe on the contradirectional-transmission frequency band as the information about the resource that can be occupied by the uplink channel of the second UE.

Figure 16:
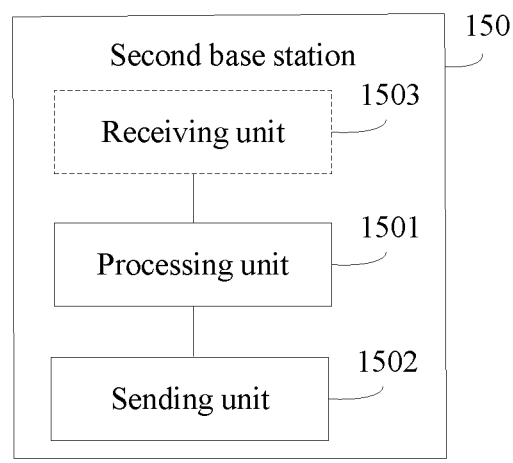
FIG. 16 is a second schematic structural diagram of a second base station according to an embodiment of the present disclosure.

Optionally, as shown in FIG. 16, the second base station 150 further includes a receiving unit 1503.

The receiving unit 1503 is configured to, before the processing unit 1501 determines, according to the control channel indication information, the information about the resource that can be occupied by the uplink channel of the second UE, receive a reference signal parameter sent by the second UE. The reference signal parameter includes at least one of the following parameters, an RSRP value or an RSRQ value.

The processing unit 1501 is further configured to, if a value of at least one parameter in the reference signal parameter is not less than a preset threshold, determine that the second UE is center UE in the second cell, or if values of all parameters in the reference signal parameter are less than the preset threshold, determine that the second UE is edge UE in the second cell.

Optionally, the contradirectional-transmission frequency band is a flexible half-duplex frequency band configured for contradirectional transmission, and the contradirectional-transmission subframe is a subframe configured for contradirectional transmission on the contradirectional-transmission frequency band.

Optionally, as shown in FIG. 16, the second base station 150 further includes the receiving unit 1503.

The processing unit 1501 is further configured to receive, using the receiving unit 1503, the control channel indication information of the first cell that is sent by the first base station.

Optionally, the processing unit 1501 is further configured to determine preconfigured information as the control channel indication information of the first cell.

It can be understood that, the second base station 150 in this embodiment of the present disclosure may be corresponding to the second base station in the interference suppression methods shown in FIG. 7 to FIG. 9A, FIG. 9B, and FIG. 9C and the second base station in the interference suppression method shown in FIG. 12. In addition, division, functions, and/or the like of the units in the second base station 150 in this embodiment of the present disclosure are all used to implement the procedures of the interference suppression methods shown in FIG. 7 to FIG. 9A, FIG. 9B, and FIG. 9C and the procedure of the interference suppression method shown in FIG. 12. For brevity, details are not described herein again.

The second base station 150 in this embodiment of the present disclosure may be configured to perform the foregoing method procedures. Therefore, for technical effects that can be obtained by the second base station 150, refer to the foregoing method embodiments. Details are not described in this embodiment of the present disclosure.

Figure 17:
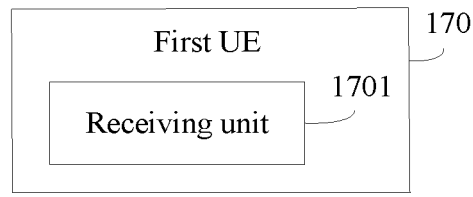
FIG. 17 is a first schematic structural diagram of first UE according to an embodiment of the present disclosure.

As shown in FIG. 17, an embodiment of the present disclosure provides an interference suppression apparatus. The apparatus may be first UE 170 configured to perform the steps performed by the first UE in the interference suppression method shown in FIG. 8, the steps performed by the first UE in the interference suppression method shown in FIG. 9A, FIG. 9B, and FIG. 9C, and the steps performed by the first UE in the interference suppression method shown in FIG. 11. The first UE 170 may include units corresponding to the corresponding steps, for example, may include a receiving unit 1701.

The receiving unit 1701 is configured to receive control channel indication information of a first cell that is sent by a first base station. The first cell is any one of cells managed by the first base station, the first UE 170 is any UE in the first cell, and the control channel indication information includes at least one piece of the following information of control channel indication information of a contradirectional-transmission frequency band on which the first cell is interfered with by a neighboring cell, or control channel indication information of a contradirectional-transmission subframe in which the first cell is interfered with by a neighboring cell.

The receiving unit 1701 is further configured to receive, according to the control channel indication information, a PDCCH sent by the first base station.

Optionally, the receiving unit 1701 is further configured to receive, in a preset codirectional-transmission subframe, the control channel indication information of the first cell that is sent by the first base station, receive, in a preset codirectional-transmission subframe, RRC signaling sent by the first base station, where the RRC signaling includes the control channel indication information of the first cell, receive system information sent by the first base station, where the system information includes the control channel indication information of the first cell, or receive a timeslot configuration sent by the first base station, where the timeslot configuration is used to indicate the control channel indication information of the first cell.

Optionally, the control channel indication information includes a PCFICH.

The receiving unit 1701 is further configured to, if the PCFICH includes a PCFICH of the contradirectional-transmission frequency band on which the first cell is interfered with by the neighboring cell, receive, in the first j OFDM symbols of each subframe on the contradirectional-transmission frequency band, the PDCCH sent by the first base station, where j is a value included in the PCFICH, if the PCFICH includes a PCFICH of the contradirectional-transmission subframe in which the first cell is interfered with by the neighboring cell, receive, in the first j OFDM symbols of the contradirectional-transmission subframe, the PDCCH sent by the first base station, or if the PCFICH includes a PCFICH of the contradirectional-transmission frequency band on which the first cell is interfered with by the neighboring cell and a PCFICH of the contradirectional-transmission subframe in which the first cell is interfered with by the neighboring cell, receive, in the first j OFDM symbols of the contradirectional-transmission subframe on the contradirectional-transmission frequency band, the PDCCH sent by the first base station.

Optionally, the contradirectional-transmission frequency band is a flexible half-duplex frequency band configured for contradirectional transmission, and the contradirectional-transmission subframe is a subframe configured for contradirectional transmission on the contradirectional-transmission frequency band.

It can be understood that, the first UE 170 in this embodiment of the present disclosure may be corresponding to the first UE in the interference suppression method shown in FIG. 8, the first UE in the interference suppression method shown in FIG. 9A, FIG. 9B, and FIG. 9C, and the first UE in the interference suppression method shown in FIG. 11. In addition, division, functions, and/or the like of the units in the first UE 170 in this embodiment of the present disclosure are all used to implement the procedure of the interference suppression method shown in FIG. 8, the procedure of the interference suppression method shown in FIG. 9A, FIG. 9B, and FIG. 9C, and the procedure of the interference suppression method shown in FIG. 11. For brevity, details are not described herein again.

The first UE 170 in this embodiment of the present disclosure may be configured to perform the foregoing method procedures. Therefore, for technical effects that can be obtained by the first UE 170, refer to the foregoing method embodiments. Details are not described in this embodiment of the present disclosure.

As shown in FIG. 14, an embodiment of the present disclosure provides an interference suppression apparatus. The apparatus may be a first base station 140 configured to perform the steps performed by the first base station in the interference suppression method shown in FIG. 13A and FIG. 13B. The first base station 140 may include units corresponding to the corresponding steps, for example, may include a processing unit 1401 and a sending unit 1402.

The processing unit 1401 is configured to obtain control channel indication information of a first cell. The first cell is any one of cells managed by the first base station 140, and the control channel indication information includes at least one piece of the following information control channel indication information of a contradirectional-transmission frequency band on which the first cell is interfered with by a neighboring cell, or control channel indication information of a contradirectional-transmission subframe in which the first cell is interfered with by a neighboring cell. The neighboring cell includes a second cell, and the second cell is any one of cells managed by the second base station.

The processing unit 1401 is further configured to if the control channel indication information includes the control channel indication information of the contradirectional-transmission frequency band on which the first cell is interfered with by the neighboring cell, configure the contradirectional-transmission frequency band as an MBSFN, and The sending unit 1402 is configured to send, to first UE on the contradirectional-transmission frequency band, downlink data that includes a DRS, where the first UE is any UE in the first cell.

Alternatively, the processing unit 1401 is further configured to, if the control channel indication information includes the control channel indication information of the contradirectional-transmission subframe in which the first cell is interfered with by the neighboring cell, configure the contradirectional-transmission subframe as an MBSFN, and the sending unit 1402 is configured to send, to the first UE on the contradirectional-transmission frequency band, downlink data that includes a DRS.

Alternatively, the processing unit 1401 is further configured to, if the control channel indication information includes the control channel indication information of the contradirectional-transmission frequency band on which the first cell is interfered with by the neighboring cell and the control channel indication information of the contradirectional-transmission subframe in which the first cell is interfered with by the neighboring cell, configure, as an MBSFN, the contradirectional-transmission subframe on the contradirectional-transmission frequency band on which the first cell is interfered with by the neighboring cell, and the sending unit 1402 is configured to send, to the first UE in the contradirectional-transmission subframe on the contradirectional-transmission frequency band, downlink data that includes a DRS.

It can be understood that, the first base station 140 in this embodiment of the present disclosure may be corresponding to the first base station in the interference suppression method shown in FIG. 13A and FIG. 13B. In addition, division, functions, and/or the like of the units in the first base station 140 in this embodiment of the present disclosure are all used to implement the procedure of the interference suppression method shown in FIG. 13A and FIG. 13B. For brevity, details are not described herein again.

The first base station 140 in this embodiment of the present disclosure may be configured to perform the foregoing method procedure. Therefore, for technical effects that can be obtained by the first base station 140, refer to the foregoing method embodiment. Details are not described in this embodiment of the present disclosure.

Figure 18:
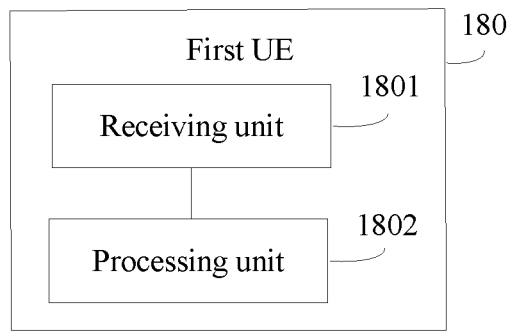
FIG. 18 is a second schematic structural diagram of first UE according to an embodiment of the present disclosure.

As shown in FIG. 18, an embodiment of the present disclosure provides an interference suppression apparatus. The apparatus may be first UE 180 configured to perform the steps performed by the first UE in the interference suppression method shown in FIG. 13A and FIG. 13B. The first UE 180 may include units corresponding to the corresponding steps, for example, may include a receiving unit 1801 and a processing unit 1802.

The receiving unit 1801 is configured to receive, on a contradirectional-transmission frequency band, downlink data that is sent by a first base station and that includes a DRS, where the contradirectional-transmission frequency band is configured as an MBSFN, and the processing unit 1802 is configured to demodulate the downlink data based on the DRS.

Alternatively, the receiving unit 1801 is configured to receive, in a contradirectional-transmission subframe, downlink data that is sent by a first base station and that includes a DRS, where the contradirectional subframe frequency band is configured as an MBSFN, and the processing unit 1802 is configured to demodulate the downlink data based on the DRS.

Alternatively, the receiving unit 1801 is configured to receive, in a contradirectional-transmission subframe on a contradirectional-transmission frequency band, downlink data that is sent by a first base station and that includes a DRS, where the contradirectional subframe frequency band on the contradirectional-transmission frequency band is configured as an MBSFN, and the processing unit 1802 is configured to demodulate the downlink data based on the DRS.

It can be understood that, the first UE 180 in this embodiment of the present disclosure may be corresponding to the first UE in the interference suppression method shown in FIG. 13A and FIG. 13B. In addition, division, functions, and/or the like of the units in the first UE 180 in this embodiment of the present disclosure are all used to implement the procedure of the interference suppression method shown in FIG. 13A and FIG. 13B. For brevity, details are not described herein again.

The first UE 180 in this embodiment of the present disclosure may be configured to perform the foregoing method procedure. Therefore, for technical effects that can be obtained by the first UE 180, refer to the foregoing method embodiment. Details are not described in this embodiment of the present disclosure.

Figure 19:
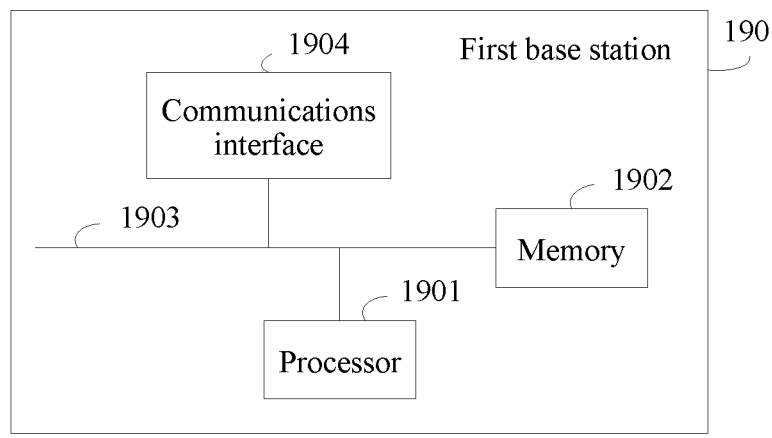
FIG. 19 is a second schematic structural diagram of a first base station according to an embodiment of the present disclosure.

As shown in FIG. 19, an embodiment of the present disclosure provides an interference suppression apparatus. The apparatus may be a first base station 190, including a processor 1901, a memory 1902, a bus 1903, and a communications interface 1904.

The memory 1902 is configured to store a computer-executable instruction. The processor 1901 and the memory 1902 are connected using the bus 1903. When the first base station 190 runs, the processor 1901 executes the computer-executable instruction stored in the memory 1902 such that the first base station 190 performs the steps performed by the first base station in the interference suppression methods shown in FIG. 7 to FIG. 9A, FIG. 9B, and FIG. 9C, the steps performed by the first base station in the interference suppression method shown in FIG. 11, or the steps performed by the first base station in the interference suppression method shown in FIG. 13A and FIG. 13B. For details of the interference suppression method, refer to the related descriptions in the embodiments shown in FIG. 7 to FIG. 9A, FIG. 9B, and FIG. 9C, the related descriptions in the embodiment shown in FIG. 11, or the related descriptions in the embodiment shown in FIG. 13A and FIG. 13B. Details are not described herein again.

In this embodiment of the present disclosure, the processor 1901 may be a central processing unit (CPU), or may be another general purpose processor, a digital signal processor (DSP), an application-specific integrated circuit (ASIC), a field-programmable gate array (FPGA) or another programmable logic device, a discrete gate or a transistor logic device, a discrete hardware component, or the like. The general purpose processor may be a microprocessor, or the processor 1901 may be any conventional processor or the like. Alternatively, the processor 1901 may be a dedicated processor. The dedicated processor may include at least one of a baseband processing chip, a radio frequency processing chip, or the like. The dedicated processor may further include a chip with another dedicated processing function of the first base station 190.

The memory 1902 may include a volatile memory, such as a random-access memory (RAM). Alternatively, the memory 1902 may include a nonvolatile memory, such as a read-only memory (ROM), a flash memory, a hard disk drive (HDD), or a solid state drive (SSD). Alternatively, the memory 1902 may include a combination of the foregoing types of memories.

The bus 1903 may include a data bus, a power bus, a control bus, a signal status bus, and the like. In this embodiment, for clarity of description, various buses are represented as the bus 1903 in FIG. 19.

The communications interface 1904 may be a transceiver in the first base station 190. The transceiver may be a wireless transceiver. For example, the wireless transceiver may be an antenna or the like in the first base station 190. The processor 1901 receives data from or sends data to another device such as first UE using the communications interface 1904.

In a specific implementation process, all the steps in the method procedures shown in FIG. 7 to FIG. 9A, FIG. 9B, and FIG. 9C, all the steps in the method procedure shown in FIG. 11, and all the steps in the method procedure shown in FIG. 13A and FIG. 13B may be implemented by executing, by the processor 1901 in a form of hardware, the computer-executable instruction stored in the memory 1902 in a form of software. To avoid repetition, details are not described herein again.

The first base station 190 provided in this embodiment of the present disclosure may be configured to perform the foregoing method procedures. Therefore, for technical effects that can be obtained by the first base station 190, refer to the foregoing method embodiments. Details are not described herein again.

Figure 20:
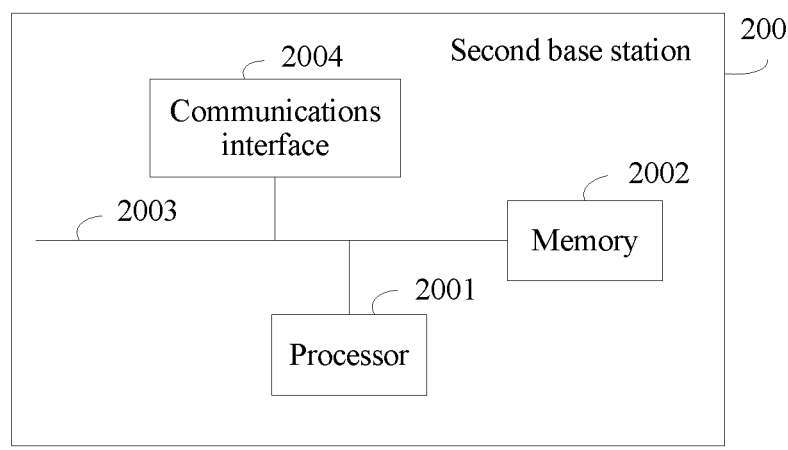
FIG. 20 is a third schematic structural diagram of a second base station according to an embodiment of the present disclosure.

As shown in FIG. 20, an embodiment of the present disclosure provides an interference suppression apparatus. The apparatus may be a second base station 200, including a processor 2001, a memory 2002, a bus 2003, and a communications interface 2004.

The memory 2002 is configured to store a computer-executable instruction. The processor 2001 and the memory 2002 are connected using the bus 2003. When the second base station 200 runs, the processor 2001 executes the computer-executable instruction stored in the memory 2002 such that the second base station 200 performs the steps performed by the second base station in the interference suppression methods shown in FIG. 7 to FIG. 9A, FIG. 9B, and FIG. 9C and the steps performed by the second base station in the interference suppression method shown in FIG. 12. For details of the interference suppression method, refer to the related descriptions in the embodiments shown in FIG. 7 to FIG. 9A, FIG. 9B, and FIG. 9C and the related descriptions in the embodiment shown in FIG. 12. Details are not described herein again.

In this embodiment of the present disclosure, the processor 2001 may be a CPU, or may be another general purpose processor, a DSP, an ASIC, an FPGA or another programmable logic device, a discrete gate or a transistor logic device, a discrete hardware component, or the like. The general purpose processor may be a microprocessor, or the processor may be any conventional processor or the like.

Alternatively, the processor 2001 may be a dedicated processor. The dedicated processor may include at least one of a baseband processing chip, a radio frequency processing chip, or the like. The dedicated processor may further include a chip with another dedicated processing function of the second base station 200.

The memory 2002 may include a volatile memory, such as a RAM. Alternatively, the memory 2002 may include a nonvolatile memory, such as a ROM, a flash memory, a hard disk, or an SSD. Alternatively, the memory 2002 may include a combination of the foregoing types of memories.

The bus 2003 may include a data bus, a power bus, a control bus, a signal status bus, and the like. In this embodiment, for clarity of description, various buses are represented as the bus 2003 in FIG. 20.

The communications interface 2004 may be a transceiver in the second base station 200. The transceiver may be a wireless transceiver. For example, the wireless transceiver may be an antenna or the like in the second base station 200. The processor 2001 receives data from or sends data to another device such as second UE using the communications interface 2004.

In a specific implementation process, all the steps in the method procedures shown in FIG. 7 to FIG. 9A, FIG. 9B, and FIG. 9C and all the steps in the method procedure shown in FIG. 12 may be implemented by executing, by the processor 2001 in a form of hardware, the computer-executable instruction stored in the memory 2002 in a form of software. To avoid repetition, details are not described herein again.

The second base station 200 provided in this embodiment of the present disclosure may be configured to perform the foregoing method procedures. Therefore, for technical effects that can be obtained by the second base station 200, refer to the foregoing method embodiments. Details are not described herein again.

Figure 21:
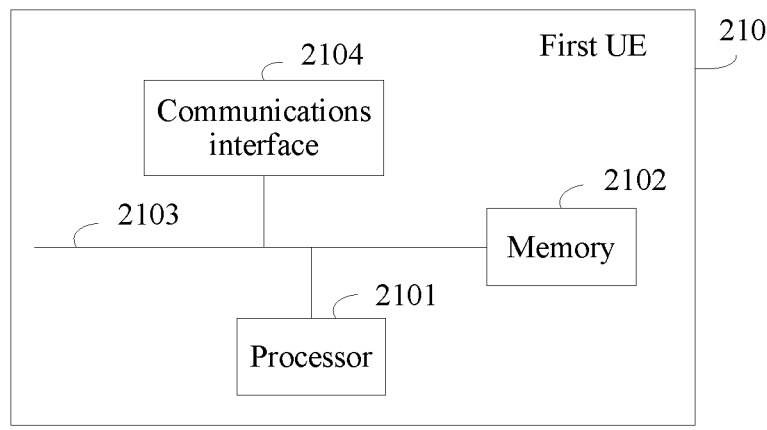
FIG. 21 is a third schematic structural diagram of first UE according to an embodiment of the present disclosure.

As shown in FIG. 21, an embodiment of the present disclosure provides an interference suppression apparatus. The apparatus may be first UE 210, including a processor 2101, a memory 2102, a bus 2103, and a communications interface 2104.

The memory 2102 is configured to store a computer-executable instruction. The processor 2101 and the memory 2102 are connected using the bus 2103. When the first UE 210 runs, the processor 2101 executes the computer-executable instruction stored in the memory 2102 such that the first UE 210 performs the steps performed by the first UE in the interference suppression method shown in FIG. 8, the steps performed by the first UE in the interference suppression method shown in FIG. 9A, FIG. 9B, and FIG. 9C, and the steps performed by the first UE in the interference suppression method shown in FIG. 11, or performs the steps performed by the first UE in the interference suppression method shown in FIG. 13A and FIG. 13B. For details of the interference suppression method, refer to the related descriptions in the embodiment shown in FIG. 8, FIG. 9A, FIG. 9B, and FIG. 9C, FIG. 11, or FIG. 13A and FIG. 13B. Details are not described herein again.

In this embodiment of the present disclosure, the processor 2101 may be a CPU, or may be another general purpose processor, a DSP, an ASIC, an FPGA or another programmable logic device, a discrete gate or a transistor logic device, a discrete hardware component, or the like. The general purpose processor may be a microprocessor, or the processor 2101 may be any conventional processor or the like.

Alternatively, the processor 2101 may be a dedicated processor. The dedicated processor may include at least one of a baseband processing chip, a radio frequency processing chip, or the like. The dedicated processor may further include a chip with another dedicated processing function of the first UE 210.

The memory 2102 may include a volatile memory, such as a RAM. Alternatively, the memory 2102 may include a nonvolatile memory, such as a ROM, a flash memory, a hard disk, or an SSD. Alternatively, the memory 2102 may include a combination of the foregoing types of memories.

The bus 2103 may include a data bus, a power bus, a control bus, a signal status bus, and the like. In this embodiment, for clarity of description, various buses are represented as the bus 2103 in FIG. 21.

The communications interface 2104 may be a transceiver in the first UE 210. The transceiver may be a wireless transceiver. For example, the wireless transceiver may be an antenna or the like in the first UE 210. The processor 2101 receives data from or sends data to another device such as a first base station using the communications interface 2104.

In a specific implementation process, all the steps in the method procedure shown in FIG. 8, all the steps in the method procedure shown in FIG. 9A, FIG. 9B, and FIG. 9C, all the steps in the method procedure shown in FIG. 11, and all the steps in the method procedure shown in FIG. 13A and FIG. 13B may be implemented by executing, by the processor 2101 in a form of hardware, the computer-executable instruction stored in the memory 2102 in a form of software. To avoid repetition, details are not described herein again.

The first UE 210 provided in this embodiment of the present disclosure may be configured to perform the foregoing method procedures. Therefore, for technical effects that can be obtained by the first UE 210, refer to the foregoing method embodiments. Details are not described herein again.

Optionally, an embodiment of the present disclosure further provides a readable medium, including a computer-executable instruction. When a processor in a first base station executes the computer-executable instruction, the first base station may perform the steps performed by the first base station in the interference suppression methods shown in FIG. 7 to FIG. 9A, FIG. 9B, and FIG. 9C, the steps performed by the first base station in the interference suppression method shown in FIG. 11, or the steps performed by the first base station in the interference suppression method shown in FIG. 13A and FIG. 13B. For details of the interference suppression method, refer to the related descriptions in the embodiments shown in FIG. 7 to FIG. 9A, FIG. 9B, and FIG. 9C, the related descriptions in the embodiment shown in FIG. 11, and the related descriptions in the embodiment shown in FIG. 13A and FIG. 13B. Details are not described herein again.

Optionally, an embodiment of the present disclosure further provides a readable medium, including a computer-executable instruction. When a processor in a second base station executes the computer-executable instruction, the second base station may perform the steps performed by the second base station in the interference suppression methods shown in FIG. 7 to FIG. 9A, FIG. 9B, and FIG. 9C and the steps performed by the second base station in the interference suppression method shown in FIG. 12. For details of the interference suppression method, refer to the related descriptions in the embodiments shown in FIG. 7 to FIG. 9A, FIG. 9B, and FIG. 9C and the related descriptions in the embodiment shown in FIG. 12. Details are not described herein again.

Optionally, an embodiment of the present disclosure further provides a readable medium, including a computer-executable instruction. When a processor in first UE executes the computer-executable instruction, the first UE may perform the steps performed by the first UE in the interference suppression method shown in FIG. 8, the steps performed by the first UE in the interference suppression method shown in FIG. 9A, FIG. 9B, and FIG. 9C, and the steps performed by the first UE in the interference suppression method shown in FIG. 11, or perform the steps performed by the first UE in the interference suppression method shown in FIG. 13A and FIG. 13B. For details of the interference suppression method, refer to the related descriptions in the embodiment shown in FIG. 8, the related descriptions in the embodiment shown in FIG. 9A, FIG. 9B, and FIG. 9C, the related descriptions in the embodiment shown in FIG. 11, and the related descriptions in the embodiment shown in FIG. 13A and FIG. 13B. Details are not described herein again.

It may be clearly understood by a person skilled in the art that, for the purpose of convenient and brief description, for the apparatus described above, division of the foregoing function modules is taken as an example for illustration. During actual application, the foregoing functions can be allocated to different modules for implementation according to a requirement, that is, an inner structure of an apparatus is divided into different function modules to implement all or some of the functions described above. For a detailed working process of the foregoing system, apparatus, and unit, refer to a corresponding process in the foregoing method embodiments. Details are not described herein again.

In the several embodiments provided in this application, it should be understood that, the disclosed system, apparatus, and method may be implemented in other manners. For example, the described apparatus embodiments are only examples. For example, the module or unit division is only logical function division and may be other division in actual implementation. For example, multiple units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, that is, may be located in one position, or may be distributed on multiple network units. Some or all of the units may be selected according to an actual requirement to achieve the objectives of the solutions of the embodiments.

In addition, function units in the embodiments of the present disclosure may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions in the present disclosure essentially, or the part contributing to other approaches, or all or a part of the technical solutions may be implemented in the form of a software product. The computer software product is stored in a storage medium and includes several instructions for instructing a computer device (which may be a personal computer, a server, a network device, or the like) or a processor to perform all or some of the steps in the methods in the embodiments of the present disclosure. The storage medium includes any medium that can store program code, such as a universal serial bus (USB) flash drive, a removable hard disk, a ROM, a RAM, a magnetic disk, or an optical disc.

The foregoing descriptions are only specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A second base station, comprising:
  a processor configured to:
    obtain control channel indication information of a first cell, wherein the first cell is any one of cells managed by a first base station, and wherein the control channel indication information comprises at least one piece of the following information:
      control channel indication information of a contra-directional-transmission frequency band on which the first cell is interfered with by a neighboring cell; or
      control channel indication information of a contra-directional-transmission subframe in which the first cell is interfered with by the neighboring cell, wherein the neighboring cell comprises a second cell, and wherein the second cell is any one of cells managed by the second base station;

determine, according to the control channel indication information, resource information that can be occupied by an uplink channel of a first user equipment (UE), wherein the first UE is any UE in the second cell;

receive a reference signal parameter from the first UE;

determine that the first UE comprises a center UE in the second cell when a value of at least one parameter in the reference signal parameter is not less than a preset threshold; and determine that the first UE comprises an edge UE in the second cell when values of all parameters in the reference signal parameter are less than the preset threshold; and a transmitter coupled to the processor and configured to send the resource information to the first UE.

2. The second base station of claim 1, wherein the control channel indication information comprises a physical control format indicator channel (PCFICH), and wherein the processor is further configured to:

determine last (14-j) orthogonal frequency division multiplexing (OFDM) symbols of each subframe on the contradirectional-transmission frequency band as the resource information that can be occupied by the uplink channel of the first UE when the PCFICH comprises a PCFICH of the contradirectional-transmission frequency band on which the first cell is interfered with by the neighboring cell, wherein j is a value comprised in the PCFICH;

determine last (14-j) OFDM symbols of the contradirectional-transmission subframe as the resource information that can be occupied by the uplink channel of the first UE when the PCFICH comprises a PCFICH of the contradirectional-transmission subframe in which the first cell is interfered with by the neighboring cell; and determine last (14-j) OFDM symbols of the contradirectional-transmission subframe on the contradirectional-transmission frequency band as the resource information that can be occupied by the uplink channel of the first UE when the PCFICH comprises the PCFICH of the contradirectional-transmission frequency band on which the first cell is interfered with by the neighboring cell and the PCFICH of the contradirectional-transmission subframe in which the first cell is interfered with by the neighboring cell.

3. The second base station of claim 1, wherein the control channel indication information comprises a physical control format indicator channel (PCFICH), and wherein when the first UE is the center UE in the second cell, the processor is further configured to:

determine all orthogonal frequency division multiplexing (OFDM) symbols of each subframe on the contradirectional-transmission frequency band as the resource information that can be occupied by the uplink channel of the first UE when the PCFICH comprises a PCFICH of the contradirectional-transmission frequency band on which the first cell is interfered with by the neighboring cell;

determine all OFDM symbols of the contradirectional-transmission subframe as the resource information that can be occupied by the uplink channel of the first UE when the PCFICH comprises a PCFICH of the contradirectional-transmission subframe in which the first cell is interfered with by the neighboring cell; and determine all OFDM symbols of the contradirectional-transmission subframe on the contradirectional-transmission frequency band as the resource information that can be occupied by the uplink channel of the first UE when the PCFICH comprises the PCFICH of the contradirectional-transmission frequency band on which the first cell is interfered with by the neighboring cell and the PCFICH of the contradirectional-transmission subframe in which the first cell is interfered with by the neighboring cell.

4. The second base station of claim 2, wherein when the first UE comprises the edge UE in the second cell, the processor is further configured to:

determine the last (14-j) OFDM symbols of each subframe on the contradirectional-transmission frequency band as the resource information that can be occupied by the uplink channel of the first UE when the PCFICH comprises the PCFICH of the contradirectional-transmission frequency band on which the first cell is interfered with by the neighboring cell;

determine the last (14-j) OFDM symbols of the contradirectional-transmission subframe as the resource information that can be occupied by the uplink channel of the first UE when the PCFICH comprises the PCFICH of the contradirectional-transmission subframe in which the first cell is interfered with by the neighboring cell; and determine the last (14-j) OFDM symbols of the contradirectional-transmission subframe on the contradirectional-transmission frequency band as the resource information that can be occupied by the uplink channel of the first UE when the PCFICH comprises the PCFICH of the contradirectional-transmission frequency band on which the first cell is interfered with by the neighboring cell and the PCFICH of the contradirectional-transmission subframe in which the first cell is interfered with by the neighboring cell.

5. The second base station of claim 3, further comprising a receiver coupled to the processor and the transmitter and configured to receive the reference signal parameter from the first UE before the processor determines, according to the control channel indication information, the resource information that can be occupied by the uplink channel of the first UE, and wherein the reference signal parameter comprises at least one of a reference signal received power (RSRP) value or a reference signal received quality (RSRQ) value.

6. The second base station of claim 1, wherein the contradirectional-transmission frequency band comprises a flexible half-duplex frequency band configured for contradirectional transmission, and wherein the contradirectional-transmission subframe comprises a subframe configured for the contradirectional transmission on the contradirectional-transmission frequency band.

7. The second base station of claim 1, further comprising a receiver coupled to the processor and the transmitter, and wherein the processor is further configured to receive, using the receiver, the control channel indication information of the first cell from the first base station.

8. The second base station of claim 1, wherein the processor is further configured to determine preconfigured information as the control channel indication information of the first cell.

9. The second base station of claim 1, wherein the reference signal parameter comprises a reference signal received power (RSRP) value.

10. The second base station of claim 1, wherein the reference signal parameter comprises a reference signal received quality (RSRQ) value.

11. A method, implemented by a second base station, comprising:
- obtaining control channel indication information of a first cell, wherein the first cell is any one of cells managed by a first base station, and wherein the control channel indication information comprises at least one piece of the following information:
  - control channel indication information of a contradirectional-transmission frequency band on which the first cell is interfered with by a neighboring cell; or
  - control channel indication information of a contradirectional-transmission subframe in which the first cell is interfered with by the neighboring cell, wherein the neighboring cell comprises a second cell, and wherein the second cell is any one of cells managed by the second base station;
- determining, according to the control channel indication information, resource information that can be occupied by an uplink channel of a first user equipment (UE), wherein the first UE is any UE in the second cell;
- receiving a reference signal parameter from the first UE;
- determining that the first UE comprises a center UE in the second cell when a value of at least one parameter in the reference signal parameter is not less than a preset threshold;
- determining that the first UE comprises an edge UE in the second cell when values of all parameters in the reference signal parameter are less than the preset threshold; and
- sending the resource information to the first UE.

12. The method of claim 11, wherein the control channel indication information comprises a physical control format indicator channel (PCFICH), and wherein the method further comprises:
- determining last (14-j) orthogonal frequency division multiplexing (OFDM) symbols of each subframe on the contradirectional-transmission frequency band as the resource information that can be occupied by the uplink channel of the first UE when the PCFICH comprises a PCFICH of the contradirectional-transmission frequency band on which the first cell is interfered with by the neighboring cell, wherein j is a value comprised in the PCFICH;
- determining last (14-j) OFDM symbols of the contradirectional-transmission subframe as the resource information that can be occupied by the uplink channel of the first UE when the PCFICH comprises a PCFICH of the contradirectional-transmission subframe in which the first cell is interfered with by the neighboring cell; and
- determining last (14-j) OFDM symbols of the contradirectional-transmission subframe on the contradirectional-transmission frequency band as the resource information that can be occupied by the uplink channel of the first UE when the PCFICH comprises the PCFICH of the contradirectional-transmission frequency band on which the first cell is interfered with by the neighboring cell and the PCFICH of the contradirectional-transmission subframe in which the first cell is interfered with by the neighboring cell.

13. The method of claim 12, wherein when the first UE comprises the edge UE in the second cell, the method further comprises:
- determining the last (14-j) OFDM symbols of each subframe on the contradirectional-transmission frequency band as the resource information that can be occupied by the uplink channel of the first UE when the PCFICH comprises the PCFICH of the contradirectional-transmission frequency band on which the first cell is interfered with by the neighboring cell;
- determining the last (14-j) OFDM symbols of the contradirectional-transmission subframe as the resource information that can be occupied by the uplink channel of the first UE when the PCFICH comprises the PCFICH of the contradirectional-transmission subframe in which the first cell is interfered with by the neighboring cell; and
- determining the last (14-j) OFDM symbols of the contradirectional-transmission subframe on the contradirectional-transmission frequency band as the resource information that can be occupied by the uplink channel of the first UE when the PCFICH comprises the PCFICH of the contradirectional-transmission frequency band on which the first cell is interfered with by the neighboring cell and the PCFICH of the contradirectional-transmission subframe in which the first cell is interfered with by the neighboring cell.

14. The method of claim 11, wherein the control channel indication information comprises a physical control format indicator channel (PCFICH), and wherein when the first UE is the center UE in the second cell, the method further comprises:
- determining all orthogonal frequency division multiplexing (OFDM) symbols of each subframe on the contradirectional-transmission frequency band as the resource information that can be occupied by the uplink channel of the first UE when the PCFICH comprises a PCFICH of the contradirectional-transmission frequency band on which the first cell is interfered with by the neighboring cell;
- determining all OFDM symbols of the contradirectional-transmission subframe as the resource information that can be occupied by the uplink channel of the first UE when the PCFICH comprises a PCFICH of the contradirectional-transmission subframe in which the first cell is interfered with by the neighboring cell; and
- determining all OFDM symbols of the contradirectional-transmission subframe on the contradirectional-transmission frequency band as the resource information that can be occupied by the uplink channel of the first UE when the PCFICH comprises the PCFICH of the contradirectional-transmission frequency band on which the first cell is interfered with by the neighboring cell and the PCFICH of the contradirectional-transmission subframe in which the first cell is interfered with by the neighboring cell.

15. The method of claim 14, further comprising receiving the reference signal parameter from the first UE before determining, according to the control channel indication information, the resource information that can be occupied by the uplink channel of the first UE, wherein the reference signal parameter comprises at least one of a reference signal received power (RSRP) value or a reference signal received quality (RSRQ) value.

16. The method of claim 11, wherein the contradirectional-transmission frequency band comprises a flexible half-duplex frequency band configured for contradirectional transmission, and wherein the contradirectional-transmission subframe comprises a subframe configured for the contradirectional transmission on the contradirectional-transmission frequency band.

17. The method of claim 11, further comprising receiving the control channel indication information of the first cell from the first base station.

18. The method of claim 11, further comprising determining preconfigured information as the control channel indication information of the first cell.

19. The method of claim 11, wherein the reference signal parameter comprises a reference signal received power (RSRP) value.

20. The method of claim 11, wherein the reference signal parameter comprises a reference signal received quality (RSRQ) value.

* * * * *